United States Patent
Tsuruta et al.

(10) Patent No.: US 11,897,379 B2
(45) Date of Patent: Feb. 13, 2024

(54) SEAT WITH SHAPE MEMORY MATERIAL MEMBER ACTUATION

(71) Applicant: Toyota Motor Engineering & Manufacturing North America, Inc., Plano, TX (US)

(72) Inventors: Ryohei Tsuruta, Ann Arbor, MI (US); Brian J. Pinkelman, Ann Arbor, MI (US); Umesh N. Gandhi, Farmington Hills, MI (US); Paul A. Gilmore, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/506,111

(22) Filed: Oct. 20, 2021

(65) Prior Publication Data
US 2023/0120436 A1 Apr. 20, 2023

(51) Int. Cl.
| | |
|---|---|
| *B60N 2/66* | (2006.01) |
| *A47C 7/46* | (2006.01) |
| *F03G 7/06* | (2006.01) |
| *B60N 2/02* | (2006.01) |

(52) U.S. Cl.
CPC .............. *B60N 2/667* (2015.04); *A47C 7/462* (2013.01); *B60N 2/0244* (2013.01); *B60N 2/66* (2013.01);
(Continued)

(58) Field of Classification Search
CPC ...... B60N 2/667; B60N 2/6671; A47C 7/462; A47C 7/465
See application file for complete search history.

(56) References Cited

U.S. PATENT DOCUMENTS

| | | | |
|---|---|---|---|
| 3,394,631 | A | 7/1968 | Thompson |
| 4,396,220 | A | 8/1983 | Dieckmann et al. |
| (Continued) | | | |

FOREIGN PATENT DOCUMENTS

| | | |
|---|---|---|
| CN | 201037277 | 3/2008 |
| CN | 101417152 A | 4/2009 |
| (Continued) | | |

OTHER PUBLICATIONS

Jani et al., "A review of shape memory alloy research, applications, and opportunities", Elsevier, 2014, pp. 1078-1113 (36 pages).
(Continued)

*Primary Examiner* — Syed A Islam
(74) *Attorney, Agent, or Firm* — Christopher G. Darrow; Darrow Mustafa PC

(57) ABSTRACT

A vehicle seat can be configured to provide support to a vehicle occupant in conditions when lateral acceleration is experienced. Shape memory material members can be operatively positioned with respect to a seat portion of the vehicle seat. The shape memory material members can be selectively activated by an activation input. When activated, the shape memory material members can engage a seat pan so as to cause the seat pan to tilt in a respective lateral direction. As a result, a seat cushion supported by the seat pan can also tilt in the respective lateral direction. The seat cushion can be tilted in a lateral direction that is opposite to the direction of the lateral acceleration. Thus, the effects of lateral acceleration felt by a seat occupant can be reduced. The shape memory material members can be selectively activated based on vehicle speed, steering angle, and/or lateral acceleration.

19 Claims, 13 Drawing Sheets

(52) U.S. Cl.
CPC ............ *F03G 7/062* (2021.08); *F03G 7/064* (2021.08); *F03G 7/06146* (2021.08); *A47C 7/465* (2013.01); *F03G 7/0614* (2021.08)

(56) References Cited

U.S. PATENT DOCUMENTS

| | | | |
|---|---|---|---|
| 4,522,447 A | 6/1985 | Snyder et al. | |
| 4,779,852 A | 10/1988 | Wassell | |
| 4,898,426 A | 2/1990 | Schulz et al. | |
| 5,482,351 A | 1/1996 | Young et al. | |
| 5,583,844 A | 12/1996 | Wolf et al. | |
| 5,662,376 A | 9/1997 | Breuer et al. | |
| 5,747,140 A | 5/1998 | Heerklotz | |
| 6,142,563 A | 11/2000 | Townsend et al. | |
| 6,155,716 A | 12/2000 | Okamura et al. | |
| 6,443,524 B1 | 9/2002 | Yu | |
| 6,481,799 B1 | 11/2002 | Whalen | |
| 6,896,324 B1 | 5/2005 | Kull et al. | |
| 6,910,714 B2 | 6/2005 | Browne et al. | |
| 6,998,546 B1 | 2/2006 | Schmidt et al. | |
| 7,100,990 B2 | 9/2006 | Kimura et al. | |
| 7,125,077 B2 | 10/2006 | Frank | |
| 7,237,847 B2 | 7/2007 | Hancock et al. | |
| 7,293,836 B2 | 11/2007 | Browne et al. | |
| 7,309,104 B2 | 12/2007 | Browne et al. | |
| 7,350,851 B2 | 4/2008 | Barvosa-Carter et al. | |
| 7,484,735 B2 | 2/2009 | Verbrugge et al. | |
| 7,506,937 B2 | 3/2009 | Bequet | |
| 7,661,764 B2 | 2/2010 | Ali et al. | |
| 7,717,520 B2 | 5/2010 | Boren et al. | |
| 7,729,828 B2 | 6/2010 | Gandhi | |
| 7,731,279 B2 | 6/2010 | Asada et al. | |
| 7,758,121 B2 | 7/2010 | Browne et al. | |
| 7,892,630 B1 | 2/2011 | McKnight et al. | |
| 7,901,524 B1 | 2/2011 | McKnight et al. | |
| 7,905,538 B2 | 3/2011 | Ukpai et al. | |
| 7,909,403 B2 | 3/2011 | Lawall et al. | |
| 7,965,509 B2 * | 6/2011 | Campbell | H01L 23/473 361/720 |
| 7,971,939 B2 | 7/2011 | Fujita et al. | |
| 8,038,215 B2 * | 10/2011 | Di Giusto | B60N 2/6673 297/284.4 |
| 8,109,567 B2 | 2/2012 | Alexander et al. | |
| 8,126,615 B2 | 2/2012 | McMillen et al. | |
| 8,240,677 B2 | 8/2012 | Browne et al. | |
| 8,313,108 B2 | 11/2012 | Ac et al. | |
| 8,366,057 B2 | 2/2013 | Vos et al. | |
| 8,793,821 B2 | 8/2014 | Fowkes et al. | |
| 8,827,709 B1 | 9/2014 | Gurule et al. | |
| 8,998,320 B2 | 4/2015 | Mankame et al. | |
| 9,428,088 B1 | 8/2016 | Rajasingham | |
| 9,457,813 B2 | 10/2016 | Hoerwick et al. | |
| 9,495,875 B2 | 11/2016 | Dowdall et al. | |
| 9,696,175 B2 | 7/2017 | Hansen et al. | |
| 9,731,828 B2 | 8/2017 | Lichota | |
| 9,784,590 B2 | 10/2017 | Englehardt et al. | |
| 9,827,888 B2 | 11/2017 | Patrick et al. | |
| 9,994,136 B2 | 6/2018 | Nakada | |
| 10,007,263 B1 | 6/2018 | Fields et al. | |
| 10,059,334 B1 | 8/2018 | Zhu et al. | |
| 10,315,771 B1 | 6/2019 | Rao et al. | |
| 10,371,299 B2 | 8/2019 | Leffler et al. | |
| 10,377,278 B2 | 8/2019 | Ketels et al. | |
| 10,479,246 B2 | 11/2019 | Meingast et al. | |
| 10,532,672 B1 | 1/2020 | Pinkelman et al. | |
| 10,583,757 B2 | 3/2020 | Ketels et al. | |
| 10,677,310 B2 | 6/2020 | Gandhi et al. | |
| 10,960,793 B2 | 3/2021 | Gandhi et al. | |
| 11,137,045 B2 | 10/2021 | Gandhi et al. | |
| 11,752,901 B2 | 9/2023 | Gandhi et al. | |
| 2003/0182041 A1 | 9/2003 | Watson | |
| 2004/0145230 A1 | 7/2004 | Fujita et al. | |
| 2004/0195888 A1 | 10/2004 | Frye | |
| 2004/0261411 A1 | 12/2004 | MacGregor | |
| 2005/0082897 A1 | 4/2005 | Ropp et al. | |
| 2005/0198904 A1 | 9/2005 | Browne et al. | |
| 2005/0206096 A1 | 9/2005 | Browne et al. | |
| 2005/0211198 A1 | 9/2005 | Froeschle et al. | |
| 2006/0038745 A1 | 2/2006 | Naksen et al. | |
| 2006/0223637 A1 | 10/2006 | Rosenberg | |
| 2007/0046074 A1 | 3/2007 | Salta et al. | |
| 2007/0236071 A1 | 10/2007 | Fujita et al. | |
| 2007/0246285 A1 | 10/2007 | Browne et al. | |
| 2007/0246898 A1 | 10/2007 | Keefe et al. | |
| 2009/0218858 A1 | 9/2009 | Lawall et al. | |
| 2009/0224584 A1 | 9/2009 | Lawall et al. | |
| 2009/0224587 A1 | 9/2009 | Lawall et al. | |
| 2009/0242285 A1 | 10/2009 | Whetstone, Jr. | |
| 2009/0284059 A1 | 11/2009 | Gupta et al. | |
| 2010/0001568 A1 | 1/2010 | Trybus et al. | |
| 2010/0066142 A1 | 3/2010 | Gross et al. | |
| 2010/0212312 A1 | 8/2010 | Rudduck | |
| 2010/0282902 A1 | 11/2010 | Rajasingham | |
| 2011/0038727 A1 | 2/2011 | Vos et al. | |
| 2012/0232783 A1 | 9/2012 | Calkins et al. | |
| 2012/0267928 A1* | 10/2012 | Mankame | B60N 2/0244 297/284.4 |
| 2012/0319445 A1 | 12/2012 | Zolno et al. | |
| 2014/0265468 A1 | 8/2014 | Greenhill et al. | |
| 2014/0333088 A1 | 11/2014 | Lang et al. | |
| 2015/0016968 A1 | 1/2015 | Grabowska et al. | |
| 2015/0130220 A1 | 5/2015 | Preisler et al. | |
| 2015/0197173 A1 | 7/2015 | Hulway | |
| 2015/0202993 A1 | 7/2015 | Mankame et al. | |
| 2016/0004298 A1 | 1/2016 | Mazed et al. | |
| 2016/0032997 A1 | 2/2016 | Seepersad et al. | |
| 2016/0084665 A1 | 3/2016 | Englehardt et al. | |
| 2016/0221475 A1 | 8/2016 | Sugiyama | |
| 2016/0325837 A1 | 11/2016 | Erhel et al. | |
| 2017/0116792 A1 | 4/2017 | Uelinek et al. | |
| 2017/0148102 A1 | 5/2017 | Franke et al. | |
| 2017/0158104 A1 | 6/2017 | Le et al. | |
| 2017/0166222 A1 | 6/2017 | James | |
| 2017/0240075 A1 | 8/2017 | Mccoy et al. | |
| 2017/0252260 A1 | 9/2017 | Gummin et al. | |
| 2018/0012433 A1 | 1/2018 | Ricci | |
| 2018/0036198 A1 | 2/2018 | Mergl et al. | |
| 2018/0130347 A1 | 5/2018 | Ricci et al. | |
| 2018/0141562 A1 | 5/2018 | Singhal | |
| 2018/0251234 A1 | 9/2018 | Wang | |
| 2018/0264975 A1 | 9/2018 | Bonk et al. | |
| 2018/0345841 A1 | 12/2018 | Prokhorov et al. | |
| 2019/0023161 A1 | 1/2019 | Sullivan et al. | |
| 2019/0042857 A1 | 2/2019 | Endo et al. | |
| 2019/0059608 A1 | 2/2019 | Yan et al. | |
| 2019/0116792 A1 | 4/2019 | Lenoir et al. | |
| 2020/0015593 A1* | 1/2020 | Norman | A47C 7/723 |
| 2020/0223325 A1 | 7/2020 | Pinkelman et al. | |
| 2020/0238854 A1 | 7/2020 | Gandhi et al. | |
| 2020/0247274 A1 | 8/2020 | Gandhi et al. | |
| 2020/0276971 A1 | 9/2020 | Takeda et al. | |
| 2020/0282878 A1* | 9/2020 | Gandhi | B60N 2/99 |
| 2020/0298732 A1 | 9/2020 | Gandhi et al. | |
| 2020/0307416 A1 | 10/2020 | Gandhi et al. | |
| 2023/0136197 A1 | 5/2023 | Gilmore et al. | |

FOREIGN PATENT DOCUMENTS

| | | |
|---|---|---|
| CN | 102333504 A | 1/2012 |
| CN | 103038094 A | 4/2013 |
| CN | 103147511 A | 6/2013 |
| CN | 204774820 U | 11/2015 |
| CN | 105517664 A | 4/2016 |
| CN | 107111473 A | 8/2017 |
| CN | 108819806 A | 11/2018 |
| DE | 10155119 A1 | 5/2003 |
| DE | 102010021902 A1 | 12/2011 |
| EP | 1904337 B1 | 10/2010 |
| EP | 2723069 A1 | 4/2014 |
| JP | 35870892 U | 5/1983 |
| JP | 2008014470 A | 1/2008 |
| JP | 5760241 | 8/2015 |
| JP | 2017175155 A | 9/2017 |
| KR | 20050056526 A | 6/2005 |

(56) References Cited

FOREIGN PATENT DOCUMENTS

| KR | 101395364 B1 | 5/2014 |
|---|---|---|
| NO | 2016130719 A2 | 8/2016 |
| WO | 2009079668 A2 | 6/2009 |
| WO | 2011017071 A2 | 2/2011 |
| WO | 2014145018 A2 | 9/2014 |
| WO | 2014172320 A1 | 10/2014 |
| WO | 2016017057 A1 | 2/2016 |
| WO | 2017077541 A1 | 5/2017 |

OTHER PUBLICATIONS

Tiseo et al., "A Shape Memory Alloy Based Tuneable Dynamic Vibration Absorber for Vibration Tonal Control", Journal of Theoretical and Applied Mechanics, 2010, pp. 135-153 (19 pages).

Williams et al., "Dynamic modelling of a shape memory alloy adaptive tuned vibration absorber", Elsevier, Journal of Vibration and Sound, 2005, pp. 211-234 (25 pages).

Araki et al., "Integrated mechanical and material design of quasi-zero-stiffness vibration isolator with superelastic Cu—Al—Mn shape memory alloy bars", Journal of Sound and Vibration, 2015 (34 pages).

Casciati et al., "Performance of a base isolator with shape memory alloy bars", Earthquake Engineering and Engineering Vibration, Dec. 2007 (8 pages).

Correa et al., "Mechanical Design of Negative Stiffness Honeycomb Materials", Integrating Materials and Manufacturing Innovation, 4:10, pp. 1-11 (2015).

Ferguson-Pell, "Seat Cushion Selection", J. Rehab. Res. Dev., Special Supplement #2, 23(3), pp. 49-73 (1986).

\* cited by examiner

SEAT WITH SHAPE MEMORY MATERIAL MEMBER ACTUATION

FIELD

The subject matter herein relates in general to seats and, more particularly, to seats with controllable portions.

BACKGROUND

A vehicle typically includes a plurality of seats. There are numerous vehicle seat designs. Vehicles seats can be configured to provide support and comfort to a vehicle occupant. Some seats can include various ergonomic features to enhance user comfort. Some vehicle seats are powered and allow a user to adjust one or more aspects of the seat.

SUMMARY

In one respect, arrangements described herein are directed to a seat. The seat can include a back portion and a plurality of shape memory material members. The shape memory material members can span laterally across the back portion. The shape memory material members can have opposing ends. The opposing ends can be operatively connected to a back portion structure. The seat can include a plurality of tubular members. The tubular members can be hollow. The tubular members can receive a substantial majority of a respective one of the shape memory material members. A portion of the respective one of the shape memory material members can be exposed outside of the tubular member. When activated, the shape memory material members can contract. The effect of the contraction can be concentrated in the portion of the respective one of the shape memory material members that is exposed outside of the tubular member.

In another respect, arrangements described herein are directed to a seat. The seat can include a back portion. The back portion can include a cushion portion. A plurality of shape memory material members can extend laterally across the back portion. The shape memory material members can have opposing ends. The opposing ends can be operatively connected to a back portion structure. The plurality of shape memory material members can be spaced from each other in an elevation direction. The seat can include a spacer. The spacer can be located between the cushion portion and one or more of the shape memory material members. The spacer can cause a curvature of the one or more shape memory material members. Such curvature can be greater than the curvature that would be achieved if the spacer were not used. When activated, the shape memory material members can contract and can cause an increased push force to be imparted on a seat occupant.

In still another respect, arrangements described herein are directed to a seat. The seat can include a back portion. The back portion can include a cushion portion. A plurality of actuators can be distributed laterally across the back portion. Each of the plurality of actuators can include a movable structure and a shape memory material member attached to the movable structure. When activated, the shape memory material member can contract and can cause the movable structure to move so as to create a push force on the cushion portion. As a result, a push force on a seat occupant is increased.

In yet another respect, arrangements described herein are directed to a seat. The seat can include a seat portion and an actuator. The actuator can be operatively positioned with respect to the seat portion to cause the seat portion to be adjusted. The actuator can be configured as a mat. The actuator can include a shape memory material sheet. The actuator can include a heating element extending on the shape memory material sheet. When heated by the heating element, the shape memory material sheet can contract and cause the actuator to morph from a substantially flat configuration to a non-flat configuration. As a result, an overall height of the actuator increases.

DETAILED DESCRIPTION

Figure 1:
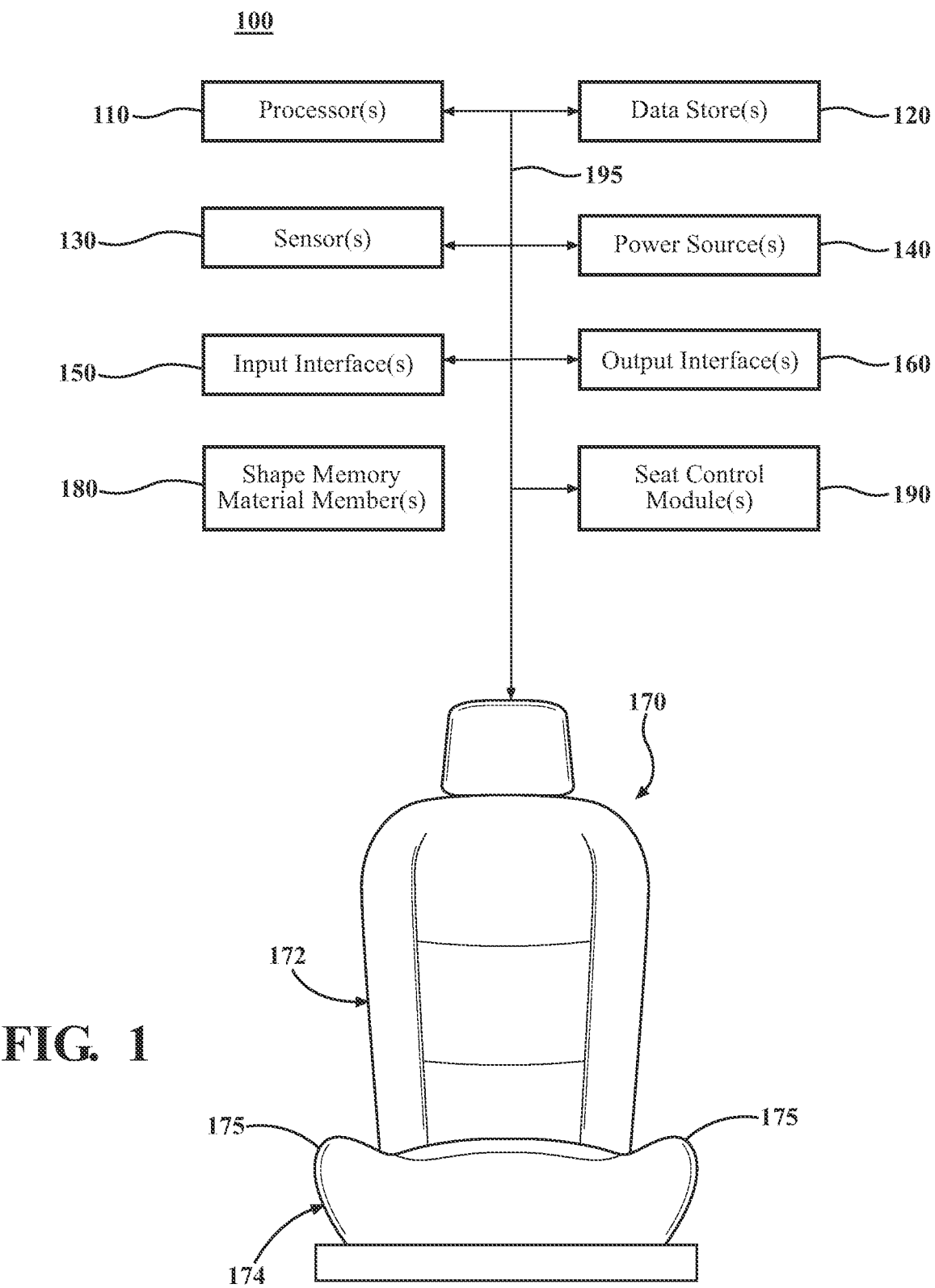
FIG. 1 is an example of a seat system.

Arrangements described here are directed to the use of shape memory material-based actuators on a seat, such as a vehicle seat, an office chair, a chair, a massage chair, a gaming chair, a recliner, or any other seat structure, now known or later developed. In some arrangements, the shape memory material members can include shape memory alloys (SMA). The actuators can be operatively positioned with respect to one or more portions of a seat, such as a back portion, a seat portion, and/or a bolster portion. In some arrangements, shape memory material members can be used in connection with a plurality of tubular members. In some arrangements, shape memory material members can be used in connection with a spacer. In some arrangements, shape memory material members can be used in connection with an actuator with a movable portion, such as a four-bar linkage. In some arrangements, shape memory material members can be used as part of a mat-like structure. As a result of these and other arrangements, the effect of the activation of the shape memory material-based actuators can be increased or enhanced. Thus, a desired effect on a seat occupant can be achieved.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-20, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a system 100 for a seat is shown. In some arrangements, the system 100 can be used in connection with vehicle. As used herein, "vehicle" means any form of transport, including any form of motorized and/or powered transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport. Further, it will be appreciated that arrangements described herein can be used in connection with various non-vehicular applications, such as chairs, office chairs, massage chairs, etc.

The system 100 can include various elements. Some of the possible elements of the system 100 are shown in FIG. 1 and will now be described. It will be understood that it is not necessary for the system 100 to have all of the elements shown in FIG. 1 or described herein. The system 100 can have any combination of the various elements shown in FIG. 1. Further, the system 100 can have additional elements to those shown in FIG. 1. In some arrangements, the system 100 may not include one or more of the elements shown in FIG. 1. Further, the elements shown may be physically separated by large distances.

When used in connection with a vehicle, the various elements of the system 100 may be located on or within a vehicle. However, it will be understood that one or more of these elements can be located external to or remote from the vehicle. Thus, such elements are not located on, within, or otherwise carried by the vehicle.

The system 100 can include one or more processors 110, one or more data stores 120, one or more sensors 130, one or more power sources 140, one or more input interfaces 150, one or more output interfaces 160, one or more seats 170, and one or more seat control modules 190. Each of these elements will be described in turn below.

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of a vehicle. For instance, one or more processors 110 can be electronic control unit(s) (ECU).

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors 130, the sensors can work independently from each other. Alternatively, two or more of the sensors can work in combination with each other. In such case, the two or more sensors can form a sensor network. The sensor(s) 130 can be operatively connected to the processor(s) 110, the data store(s) 120, and/or other elements of the system 100 (including any of the elements shown in FIG. 1).

The sensor(s) 130 can include any suitable type of sensor. Various examples of different types of sensors will be described herein. However, it will be understood that the embodiments are not limited to the particular sensors described.

When the system 100 is used in connection with a vehicle, the sensor(s) 130 can include one or more vehicle sensors and one or more environment sensors. The vehicle sensor(s) can detect, determine, assess, monitor, measure, quantify and/or sense information about a vehicle itself (e.g., position, orientation, speed, etc.). In one or more arrangements, the vehicle sensors can include one or more vehicle speed sensors, one or more steering angle sensors, and/or one or more accelerometers. The vehicle speed sensors can be any sensor configured to detect, determine, assess, monitor, measure, quantify and/or sense the speed of a vehicle, now known or later developed. The steering angle sensors, can be any sensor configured to detect, determine, assess, monitor, measure, quantify and/or sense the steering wheel position angle and/or rate of turn, now known or later developed. The accelerometers can include any sensor, now know or later developed, configured to detect, determine, assess, monitor, measure, quantify and/or sense any information or data about acceleration forces experience by a vehicle or occupants of the vehicle, including lateral acceleration forces.

The sensor(s) 130 can include one or more environment sensors configured to detect, determine, assess, monitor, measure, quantify, acquire, and/or sense driving environment data. "Driving environment data" includes and data or information about the external environment in which a vehicle is located or one or more portions thereof. In one or more arrangements, the environment sensors can include one or more cameras, one or more radar sensors, one or more lidar sensors, one or more sonar sensors, and/or one or more ranging sensors.

As noted above, the system 100 can include one or more power sources 140. The power source(s) 140 can be any power source capable of and/or configured to energize the shape memory material members, as will be described later. For example, the power source(s) 140 can include one or more batteries, one or more fuel cells, one or more generators, one or more alternators, one or more solar cells, and combinations thereof.

The system 100 can include one or more input interfaces 150. An "input interface" includes any device, component, system, element or arrangement or groups thereof that enable information/data to be entered into a machine. The input interface(s) 150 can receive an input from a person (e.g., a vehicle occupant, a seat occupant, etc.). Any suitable input interface 150 can be used, including, for example, a keypad, display, touch screen, multi-touch screen, button, joystick, mouse, trackball, microphone and/or combinations thereof.

The system 100 can include one or more output interfaces 160. An "output interface" includes any device, component, system, element or arrangement or groups thereof that enable information/data to be presented to a person (e.g. a vehicle occupant, a seat occupant, etc.). The output interface(s) 160 can include a display. Alternatively or in addition, the output interface(s) 160 may include an earphone and/or speaker. Some components of the system 100 may serve as both a component of the input interface(s) 150 and a component of the output interface(s) 160.

The system 100 can include one or more seats 170. The seat(s) 170 can be any type of seat, now known or later developed. The seat(s) 170 can have any suitable configuration. For instance, the seat(s) 170 can include a back portion 172 and a seat portion 174. In some arrangements, the seat(s) 170 can include one or more bolsters 175. In some arrangements, the seat(s) 170 can include a headrest 173.

In some arrangements, the seat(s) 170 can be vehicle seats. The seat(s) 170 can be for any vehicle occupants, such for a driver or for a passenger. According to arrangements herein, one or more portions of the seat(s) 170 can be configured to counteract lateral acceleration forces experienced by a vehicle occupant. In some arrangements, the seat(s) 170 can be office chairs, massage chairs, a gaming chair, a recliner, or any other type of seat or chair, now known or later developed. The seat(s) 170 can include one or more actuators that include the one or more shape memory material members 180. The actuators and/or the shape memory material member(s) are described later in this description.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 210 can be shape memory material wires. As an example, the shape memory material members 210 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 250 MPA to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 210 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connected with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members 180 are described, in some implementations, as being wires, it will be understood that the shape memory material members 180 are not limited to being wires. Indeed, it is envisioned that suitable shape memory materials may be employed in a variety of other forms, such as sheets, plates, panels, strips, cables, tubes, or combinations thereof. In some arrangements, the shape memory material members 180 may include an insulating coating.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or additionally, one or more data stores 120 may contain such instructions.

In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 100 can include one or more seat control modules 190. The seat control module(s) 190 can include profiles and logic for actively controlling one or more portions of the seat(s) 170 according to arrangements herein. The seat control module(s) 190 can be configured to determine when the seat(s) 170 or portions thereof should be activated or deactivated. The seat control module(s) 190 can be configured to do so in any suitable manner. For instance, the seat control module(s) 190 can be configured to analyze data or information acquired by the sensor(s) 130. The seat control module(s) 190 can be configured to determine whether an activation or deactivation condition is met. In response to determining that the activation condition is met, the seat control module(s) 190 can be configured to cause one or more shape memory material members to be activated or deactivated. As used herein, "cause" or "causing" means to make, force, compel, direct, command, instruct, and/or enable an event or action to occur or at least be in a state where such event or action may occur, either in a direct or indirect manner. For instance, the seat control module(s) 190 can selectively permit or prevent the flow of electrical energy from the power source(s) 140 to the seat(s) 170, one or more portions thereof, or to one or more of the shape memory material members 180 associated with the seat(s) 170. The seat control module(s) 190 can be configured send control signals or commands over a communication network 195 to the shape memory material members.

The seat control module(s) 190 can be configured to cause the shape memory material member(s) 180 associated with the seat portion 174 to be selectively activated or deactivated based on one or more activation parameters. For instance, the seat control module(s) 190 can be configured to compare one or more detected activation characteristics to one or more activation thresholds. If the threshold is met, then the seat control module(s) 190 can cause one or more of the shape memory material members 180 associated with the seat portion 174 to be activated or maintained in an activated condition. If the threshold is not met, then the seat control module(s) 190 can cause the shape memory material member(s) 180 to be deactivated or maintained in a deactivated or non-activated state.

For instance, there can be a vehicle speed threshold, a steering angle threshold, an acceleration threshold, and/or a lateral acceleration threshold. Thus, if a detected or determined parameter of the vehicle is above the associated threshold, the seat control module(s) 190 can be configured to cause the shape memory material member(s) 180 to be activated or maintained in an activated state. If the parameter is below the associated threshold, the seat control module(s) 190 can be configured to cause the shape memory material member(s) 180 to be deactivated or maintained in a deactivated state.

In some instances, the seat control module(s) 190 can be configured to cause the shape memory material member(s)

180 to be selectively activated or deactivated based on user inputs (e.g., commands), which can be provided on the input interface(s) 150. For instance, a user can provide an input on the input interface(s) 150. The input can be to activate or deactivate the shape memory material member(s) 180. The seat control module(s) 190 can be configured to cause the shape memory material member(s) 180 to be deactivated or activated in accordance with the user input.

The various elements of the system 100 can be communicatively linked to one another or one or more other elements through one or more communication networks 195. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the system 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The shape memory material member(s) 180 can be used in various ways in connection with the system 100. Various examples will now be described.

Figure 2:
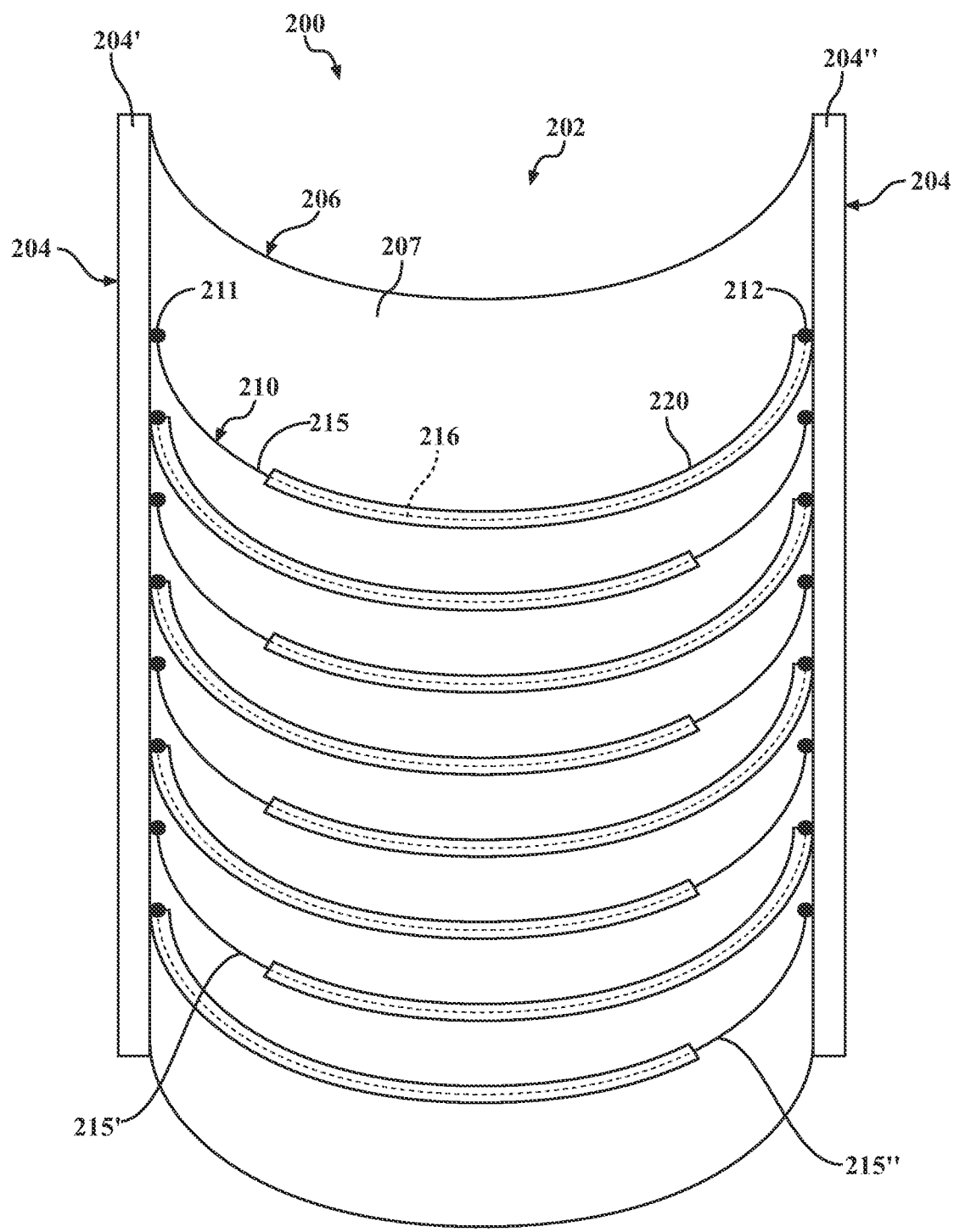
FIG. 2 is an example of a back portion of a seat, showing a first arrangement of shape memory material members and tubular members.

A first example of implementations of the system 100 are shown in connection with FIGS. 2-6. Referring to FIG. 2, a back portion 202 of a seat 200 is shown. The back portion 202 can include a frame 204 and a seatback 206. The seat 200 can include an elevational direction E, which can correspond to the up-down direction on the page of FIG. 2. The seat 200 can include a lateral direction L, which can correspond to the left-right direction on the page in FIG. 2. The seat 200 in FIGS. 2-6 can be any type of seat, now known or later developed. In some arrangements, the seat 200 can be a vehicle seat, an office chair, a chair, a massage chair, a gaming chair, a recliner, or other seat structure.

In some arrangements, the frame 204 can include a first frame member 204' and a second frame member 204". In some arrangements, the first frame member 204' and the second frame member 204" can be substantially parallel to each other. In some arrangements, the first frame member 204' and the second frame member 204" can extend in a substantially vertical direction. The frame 204 can be a relatively rigid structure. The seatback 206 can be a relatively soft material. The seatback 206 can be curved. The seatback 260 can space between the first frame member 204' and the second frame member 204".

The seat 200 can include a plurality of shape memory material members 210. The shape memory material members 210 can be the shape memory material members 180 described in connection with FIG. 1 above. The shape memory material members 210 can span generally in a lateral direction across the seatback 206. The shape memory material members 210 can have opposing ends 211, 212. The opposing ends 211, 212 can be operatively connected to a back portion structure, such as the first frame member 204' and the second frame member 204". The shape memory material members 210 can extend substantially parallel to each other. The shape memory material members 210 can be spaced from each other in the elevational direction E. In some arrangements, the shape memory material members 210 can be substantially equally spaced from each other. In some arrangements, one of more of the shape memory material members 210 can be non-equally spaced from the other shape memory material members 210. The shape memory material members 210 can be on a back side 207 of the seatback 206. Thus, the shape memory material members 210 can face away from a seat occupant. The shape memory material members 210 can be separated from a seat occupant by at least the seatback 206.

The shape memory material members 210 can be substantially identical to each other. Alternatively, one or more of the shape memory material members 210 can be different from the other shape memory material members 210 in one or more respects.

There can be any number of shape memory material members 210. While FIG. 2 shows an example in which there are eight shape memory material members 210, it will be appreciated that there can be more or fewer shape memory material members 210.

According to arrangements described herein, the seat 200 can include a plurality of tubular members 220. The tubular members 220 can be hollow. Each of the plurality of tubular members 220 can receive a respective one of the shape memory material members 210. More particularly, each of the plurality of tubular members 220 can receive a substantial majority of a respective one of the shape memory material members 210. As used herein, "majority" means 50.01 percent or greater. As used herein, "substantial majority" means 70 percent or greater, 75 percent or greater, 80 percent or greater, 85 percent or greater, 90 percent or greater, 95 percent or greater, 96 percent or greater, 97 percent or greater, 98 percent or greater, or 99 percent or greater.

The tubular members 220 can have a length. The shape memory material members 210 can have a length. The length of the shape memory material members 210 can be greater than the length of the tubular members 220. As a result, a portion of the respective one of the shape memory material members 210 can be exposed outside of the tubular member 220. Such a portion will be referred to as the exposed portion 215 of the shape memory material member 210. The portion of the shape memory material members 210 located within the tubular member 220 will be referred to as the non-exposed portion 216 of the shape memory material member 210.

The tubular members 220 can have any suitable size, shape, and/or configuration. In one or more arrangements, the tubular members 220 can have a substantially circular cross-sectional shape. In some arrangements, the tubular members 220 can extend substantially straight across their entire length. Alternatively, in some arrangements, the tubular members 220 can have one or more non-straight features (e.g., curves, bends, etc.) in one or more areas or across the entire length of the tubular member 220. In the example shown in FIG. 2, the tubular members 220 are curved along their entire length.

The tubular members 220 can be made of any suitable material. As examples, the tubular members 220 can be made of metal or plastic. For instance, in some arrangements, the tubular members 220 can be made of a material configured to withstand at least about 110 degrees Celsius to about 120 degrees Celsius. In some arrangements, the tubular members 220 can be rigid. Thus, during normal operational conditions of the seat 200 and/or the shape memory material members 210, the tubular members 220 do not substantially change in shape.

There can be various arrangements between the tubular members 220 and the shape memory material members 210. In some arrangements, one of the tubular members 220 can be offset relative to the respective shape memory material member 210 such that only one end of the shape memory material member is exposed. An example of such an arrangement is shown in FIG. 2. In this example, the exposed portion of the shape memory material member(s) 210 can be located on alternating sides of the back portion 202. For instance, there can be a left-side exposed portion 215' and a right-side exposed portion 215".

In some arrangements, an end of the tubular members 220 can be attached to a portion of the seat 200. For instance, an end of the tubular members 220 can be operatively connected to a respective one of the frame members 204', 204". Any suitable form of operative connection can be used, including, for example, one or more welds, one or more adhesives, one or more forms of mechanical engagement, or any combination thereof, just to name a few possibilities.

It should be noted that the shape memory material members 180 can be activated in any suitable manner. For instance, in some instances, all or any subset of the shape memory material members 180 with the left-side exposed portion 215' can be activated. In some instances, all or some of the shape memory material members 180 with the right-side exposed portion 215" can be activated. In some instances, all or any subset of the shape memory material members 180 with the left-side exposed portion 215' and the shape memory material members 180 with the right-side exposed portion 215" can be activated, simultaneously or alternatingly.

Figure 3:
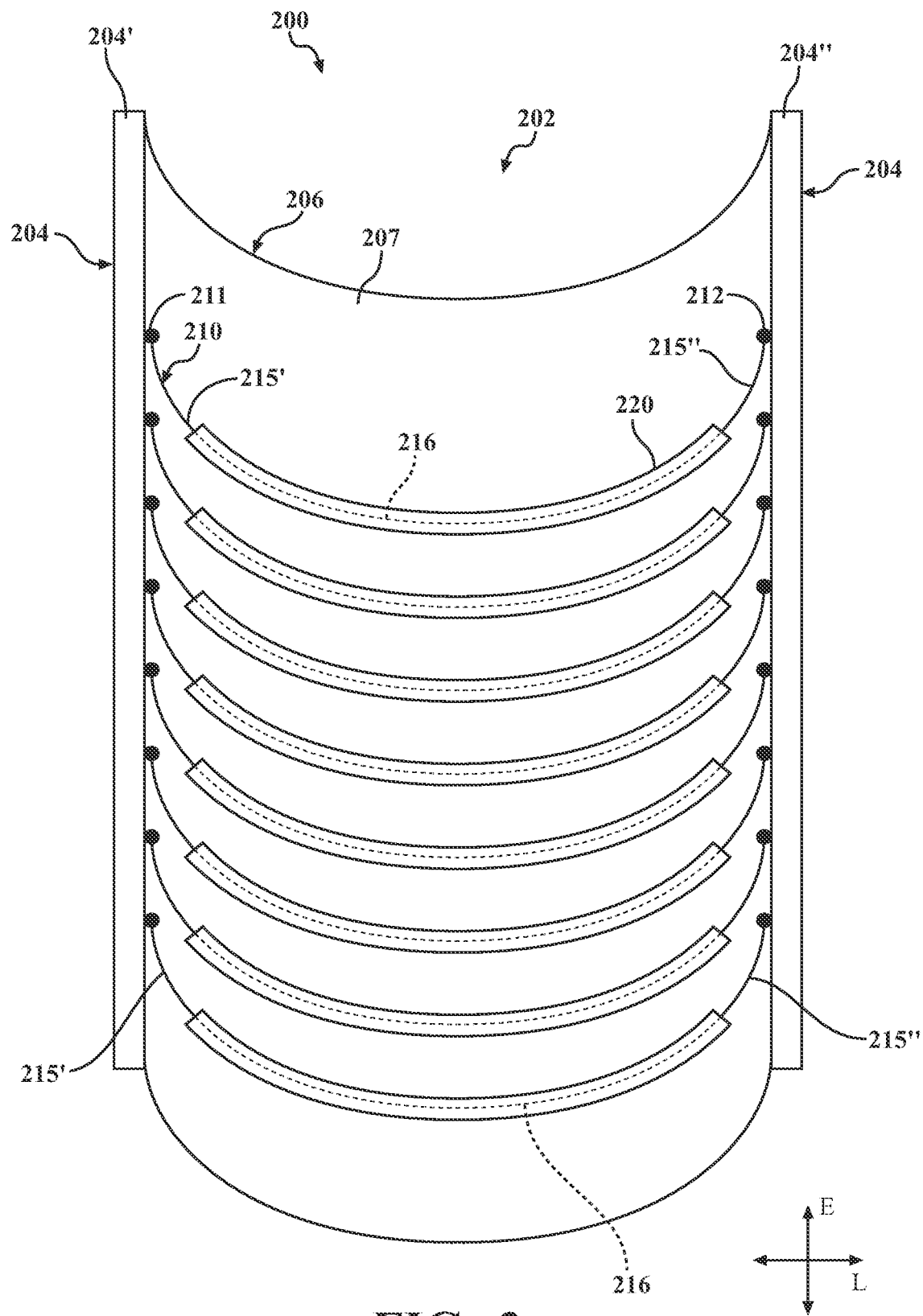
FIG. 3 is an example of a back portion of a seat, showing a second arrangement of shape memory material members and tubular members.

In some arrangements, the tubular members 220 can be centrally located on the respective shape memory material members 210. In such case, there can be an exposed portion 215 of the shape memory material members 180 on both sides of the tubular member 220. An example of such arrangements is shown in FIG. 3. The shape memory material members 180 can be activated in any suitable manner. For instance, in some instances, all or any subset of the shape memory material members 180 can be activated.

Figure 4A:
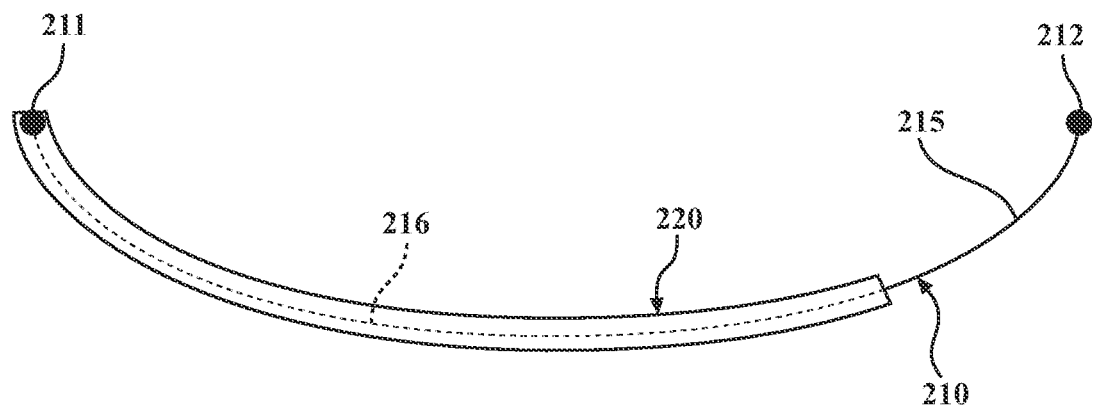
FIG. 4A shows an example a shape memory material member with a tubular member in a non-activated condition.
Figure 4B:
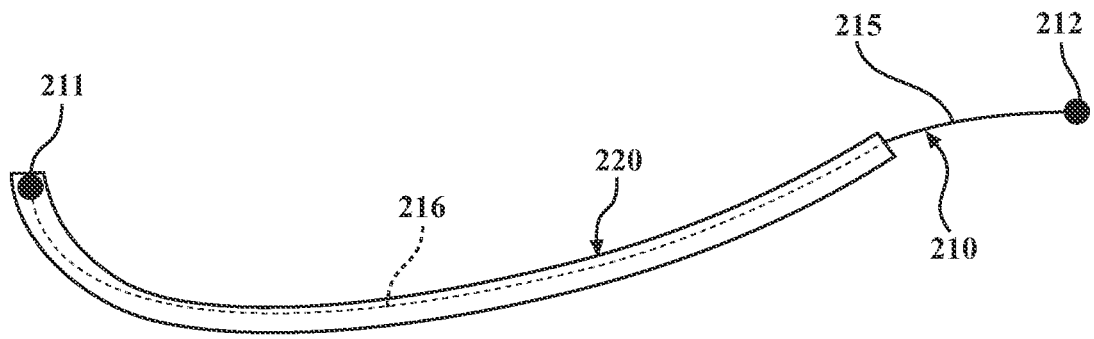
FIG. 4B shows an example the shape memory material member with the tubular member in an activated condition.

An example of the operation of the arrangements shown in FIGS. 2 and 3 will now be described. When activated, the shape memory material members 210 can contract. The effect of the contraction can be concentrated in a region including the exposed portion(s) 215 of the activated shape memory material member(s) 210. Referring to FIGS. 4A and 4B, an example of the concentrated effect of the shape memory material member(s) 210 is shown. FIG. 4A shows a non-activated condition of the shape memory material member(s) 210. FIG. 4B shows an activated condition of the shape memory material member(s) 210.

When heated or otherwise activated, the shape memory material member 210 can shrink. However, due to the presence of the tubular member 220, the effect of the contraction can be concentrated on the exposed portion 215 of the shape memory material member 210. Thus, it will be appreciated that a greater effect can be transmitted to the seat occupant in such areas. Indeed, the portion of the shape memory material members 210 located within the tubular members 220 will contract, but the effect would not impact the back portion 202 in such locations because of the presence of the tubular members 220. As is apparent from comparing FIGS. 4A and 4B, there is little change on the left-side of the shape memory material member 210. In contrast, there is a pronounced change on the right-side of the shape memory material member 210.

Figure 5A:
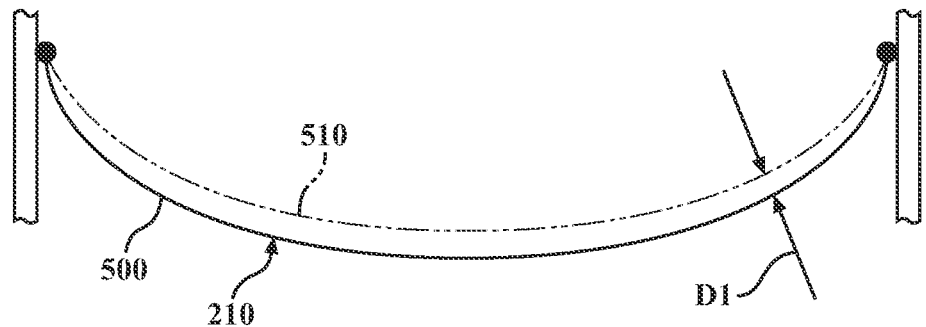
FIG. 5A shows an example of the shape memory material member without a tubular member, showing the difference between a non-activated condition and an activated condition of the shape memory material member.

The change on the right-side of the shape memory material member 210 can be greater than would be achieved in the absence of the tubular member 220. To illustrate the point, FIGS. 5A and 5B will now be described. FIG. 5A shows an example of the shape memory material member 210 that does not pass through a tubular member 220. Here, the shape memory material member 210 is shown in a non-activated condition 500 and in an activated condition 510. The change in position of the shape memory material member 210 is substantially the same along the length of the shape memory material member 210. The shape memory material member 210 can move a distance D1 in going from the non-activated condition 500 to the activated condition 510.

Figure 5B:
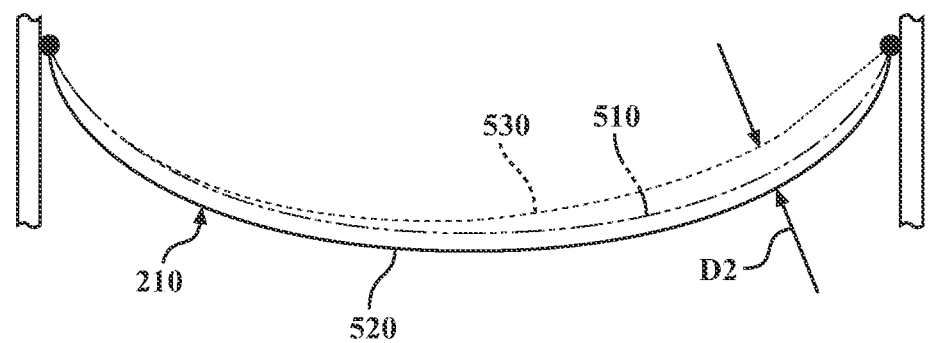
FIG. 5B shows an example of the shape memory material member with a tubular member, showing the difference between a non-activated condition and an activated condition of the shape memory material member and further showing the activated condition of the shape memory material member from FIG. 5A.

FIG. 5B shows an example of the shape memory material member 210 when used in connection with a tubular member 220. The tubular member 220 is not shown in FIG. 5B for purposes of clarity and/or simplicity. Here, the shape memory material member 210 is shown in a non-activated condition 520 and in an activated condition 530. The change in position of the shape memory material member 210 is concentrated largely on the right side of the shape memory material member 210 in a location that includes the exposed portion 215 of the shape memory material member 210. FIG. 5B also shows the activated condition 510 of the shape memory material member 210 from FIG. 5A. As is evident, the degree of change on the right side of the shape memory material member 210 is greater with the shape memory material member 210 that is used in connection with a tubular member 220. The shape memory material member 210 can move a distance D2 in going from the non-activated condition 520 to the activated condition 530. The distance D2 can be greater than the distance D1.

When the seat 200 include a plurality of shape memory material members 210, the shape memory material members 210 can be activated in any combination and/or sequence. The shape memory material members 210 can be activated based on real-time conditions (e.g., direction the vehicle is turning) or based on a user input.

Figure 6:
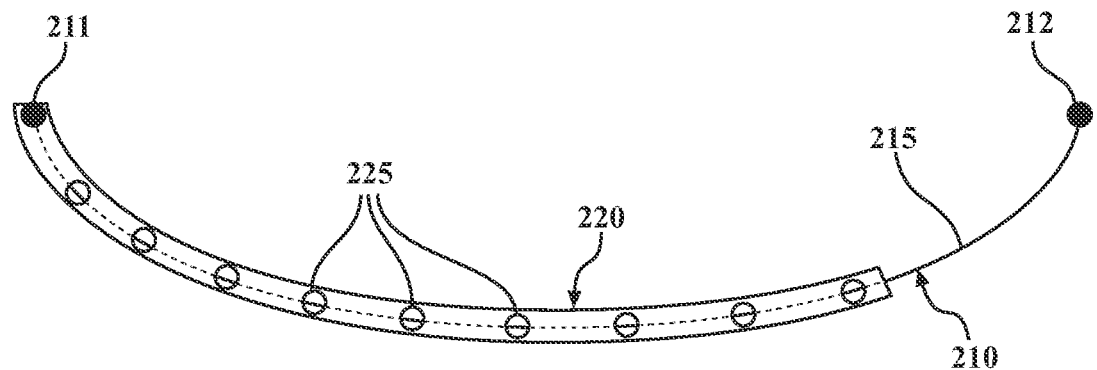
FIG. 6 is an example of a tubular member including a plurality of cooling apertures.

In some arrangements, the tubular members 220 can be configured to facilitate cooling of the shape memory material member(s) 210 received therein. One example of such a configuration is shown in FIG. 6. In this example, a plurality of apertures 225 can be defined in the tubular member 220. The apertures 225 can facilitate cooling of the shape memory material member(s) 210 that are received within the tubular member 220.

The apertures 225 can have any suitable size, shape, and/or configuration. For instance, the apertures 225 can be circular, oval, rectangular, triangular, or polygonal in shape, just to name a few possibilities. The apertures 225 can be substantially identical to each other. Alternatively, one or more of the apertures 225 can be different from the other apertures 225 in one or more respects, including size, shape, and/or configuration. There can be any suitable quantity of apertures 225. The apertures 225 can be distributed in any suitable manner on the tubular members 220.

The apertures 225 can allow cooling air to reach the portion of the shape memory material member 210 located within the tubular member 220, particular, when not activated. The cooling air can facilitate cool down of the shape memory material member 210. As a result, the shape memory material member 210 can return to a non-activated configuration sooner. In some arrangements, the cooling air can be ambient air. In other arrangements, the cooling air can be supplied to the apertures 225 and/or the interior of the tubular members 220 by an air movement device, such as a fan, blower, or duct.

The arrangements shown in FIGS. 2-6 can enhance the movement of a seat portion (e.g., the back portion 202) due to shrinkage of the shape memory material member. The tubular member 220 can help to concentrate the movement in a selected area.

Figure 7:
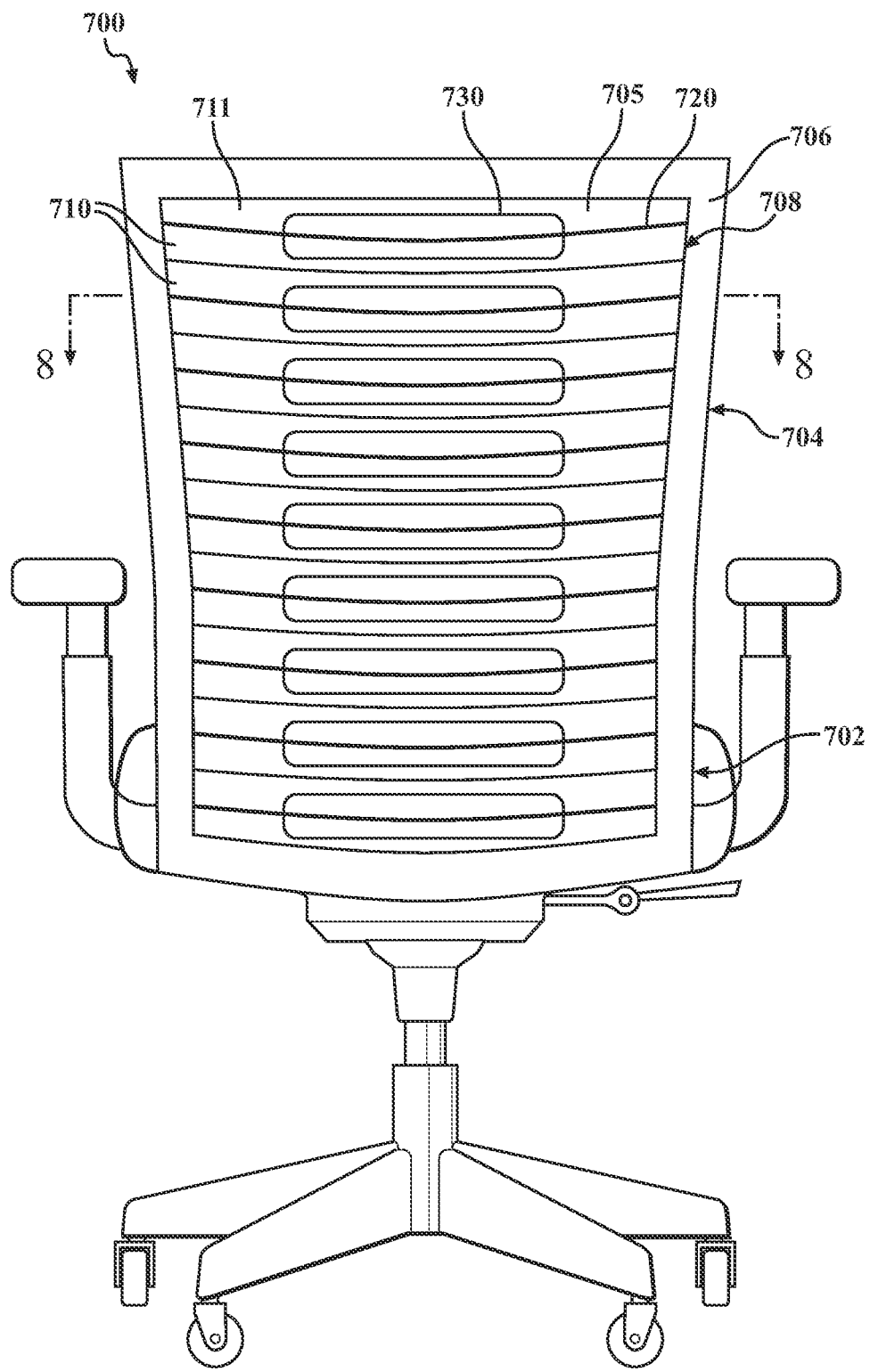
FIG. 7 is an example of a chair with a plurality of shape memory material members and spacers on a back portion of the chair.

A second example of implementations of the system 100 are shown in connection with FIGS. 7-10. Referring to FIG. 7, an example of a seat 700 is shown. In this example, the seat can be an office chair. However, it will be appreciated that arrangements described herein are not limited to being office chairs. Indeed, the seat 700 in FIGS. 7-10 can be any type of seat, now known or later developed. In some arrangements, the seat 700 can be a vehicle seat, a chair, a massage chair, a gaming chair, a recliner, or other seat structure.

The seat 700 can include a seat portion 702 and a back portion 704. The back portion 704 can have any suitable configuration, now known or later developed. In some arrangements, the back portion 704 can include a frame 706 and a cushion portion 708. The cushion portion 708 can be operatively connected to the frame 706. In some arrangements, the cushion portion 708 can be a single piece. In some arrangements, the cushion portion 708 can include a plurality of strap members 710. In some arrangements, the plurality of strap members 710 can extend substantially laterally across the back portion 704. The strap members 710 can be connected to the frame 706. The plurality of strap members 710 can be substantially parallel to each other. In some arrangements, the plurality of strap members 710 can be spaced from each other. In some arrangements, neighboring strap members 710 can abut each other, or they can even overlap each other. In some arrangements, the strap members 710 can be separate from the cushion portion 708. In some instances, the cushion portion 708 can be located closer to a seat occupant than the strap members 710.

The seat 700 can include one or more shape memory material members 720 and one or more spacers 730. The spacer(s) 730 can be located between the shape memory material member(s) 720 and the back portion 704 of the seat 700. The shape memory material member(s) 720 can be the shape memory material members 180 described in connection with FIG. 1 above. The shape memory material member(s) 720 can span generally in a lateral direction across the back portion 704. The shape memory material member(s) 720 can have opposing ends. The opposing ends can be operatively connected to the frame 706.

The shape memory material member(s) 720 can extend substantially parallel to each other. The shape memory material member(s) 720 can be spaced from each other in the elevational direction. In some arrangements, the shape memory material member(s) 720 can be substantially equally spaced from each other. In some arrangements, one of more of the shape memory material members 720 can be non-equally spaced from the other shape memory material members 720. The shape memory material members 720 can be on a back side 705 of the back portion 704. Thus, the shape memory material members 720 can face away from a seat occupant.

The shape memory material members 720 can be substantially identical to each other. Alternatively, one or more of the shape memory material members 720 can be different from the other shape memory material members 720 in one or more respects, including in any of the various respects described herein.

There can be any number of shape memory material members 720. While FIG. 7 shows an example in which there are nine shape memory material members 720, it will be appreciated that there can be more or fewer shape memory material members 720.

In some arrangements, there can be one shape memory material member 720 associated with each strap member 710. In some arrangements, there can be more than one shape memory material member 720 associated with at least one of the strap members 710. The shape memory material member(s) 720 can extend along a back side 711 of the strap members 710. The back side 711 of the strap members 710 can face away from a seat occupant.

The seat 700 can include a spacer 730. The spacer 730 can be located between at least one of the plurality of shape memory material members 720 and the cushion portion 708. In some arrangements, there can be one spacer 730 associated each strap member 710. In some arrangements, there can be a spacer 730 associated with a plurality of strap members 710. For instance, one spacer 730 can be associated with two neighboring strap members 710. In some arrangements, there can be a plurality of spacers 730 associated with a strap member 710. In such case, the plurality of spacers 730 can, for example, be distributed laterally across the strap member 710. In some arrangements, there can be one or more strap members 710 that do not have a spacer 730 associated with it.

FIG. 7 shows a plurality of spacers 730 being centrally located on the strap members 710. However, it will be appreciated that the spacers 730 can be located anywhere on the strap members 710. For instance, some of the strap members 710 can have a spacer 730 that is offset to the right side and/or to the left side of the strap member 710. Further, FIG. 7 shows the plurality of spacers 730 being substantially aligned with each other so as to form a column. However, it will be appreciated that one or more spacers 730 can be offset from the other spacers 730.

Figure 8A:
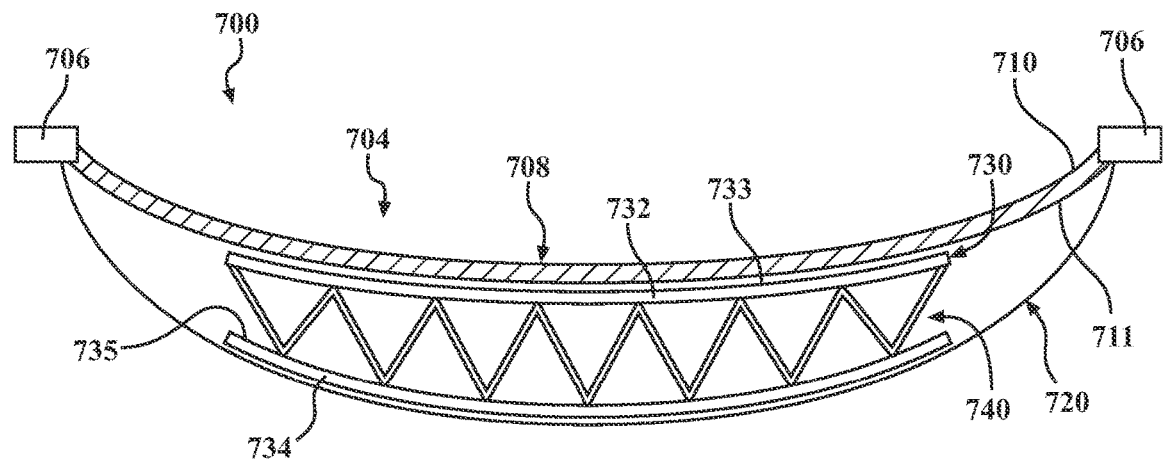
FIG. 8A is an example of a cross-section view of a back portion of the chair, viewed along line 8-8 in FIG. 7, and showing a non-activated condition of the shape memory material member.
Figure 8B:
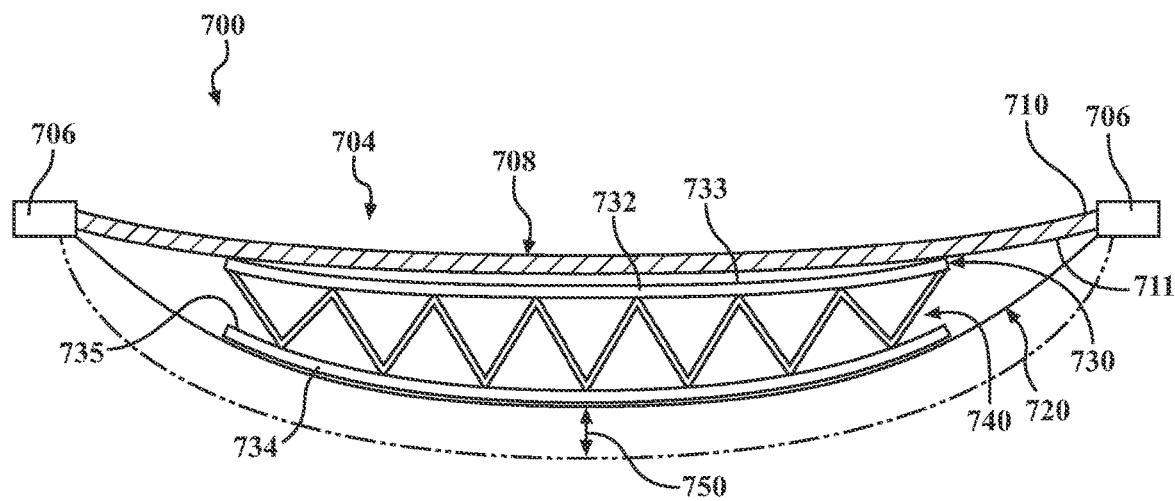
FIG. 8B is an example of a cross-section view of a back portion of the chair, viewed along line 8-8 in FIG. 7, and showing an activated condition of the shape memory material member.

The spacer 730 can have any suitable size, shape, and/or configuration. Some examples of the spacer 730 are shown in FIGS. 8A and 8B. For instance, the spacer 730 can include an inner frame member 732 and an outer frame member 734. In this context, the terms "inner" and "outer" are used for convenience relative to their respective position relative to the cushion portion 708. In some arrangements, the inner frame member 732 and/or the outer frame member 734 can be curved. The inner frame member 732 and/or the outer frame member 734 can include a concave surface 733, 735, respectively. The inner frame member 732 and the outer frame member 734 can generally conform to the shape of the cushion portion 708 of the seat 700. The inner frame member 732 and the outer frame member 734 can be spaced from each other.

The spacer 730 can include one or more connecting members 740. The connecting members 740 can be located between the inner frame member 732 and the outer frame member 734. The connecting members 740 can have any suitable form. For instance, the connecting members 740 can form a zig-zag type pattern, as shown in FIGS. 8A and 8B. In some arrangements, the connecting member(s) 740 can be operatively connected to the inner frame member 732 and/or the outer frame member 734. In some arrangements, the connecting member(s) 740 may not be attached to the inner frame member 732 and/or the outer frame member 734.

In some arrangements, the spacer 730 can be rigid. Thus, the spacer 730 does not substantially deform when compressed by the shape memory material member(s) 720. In some arrangements, the spacer 730 can be configured to be rigid in compression.

In some or more arrangements, the spacer 730 can be an auexetic spacer. Auxetics are structures or materials that have a negative or zero Poisson's ratio. Thus, the spacer 730 can shrink when compressed and can substantially maintaining its overall outer envelope, at least in the left to right direction and/or in the up and down direction on the page in FIG. 7. In some arrangements, the connecting members 740 can include one or more bi-stable structures, which can be in the form of a lattice block. Non-limiting example of such bi-stable structures and/or lattice blocks are disclosed in U.S. Pat. No. 10,479,246, which is incorporated herein by reference in its entirety.

An example of the operation of these arrangements will now be described in connection with FIGS. 8A and 8B. FIG. 8A is an example of a cross-section view of a back portion 704 of the seat 700, viewed along line 8-8 in FIG. 7. FIG. 8 shows a non-activated condition of the shape memory material member(s) 720.

When activated (such as by heating), the shape memory material member(s) 720 can contract. FIG. 8B shows an activated condition of the shape memory material member. The shape memory material member(s) 720 can move a distance 750 toward the cushion portion 708 and/or toward the seat occupant. The contraction of the shape memory material member(s) 720 can cause the spacer 730 to be compressed. The spacer 730 can compress without increasing its overall footprint. The compressive effects of the shape memory material member(s) 720 and/or the spacer 730 can be felt by a seat occupant.

Due to the presence of the spacer 730, it will be appreciated that a larger than normal movement of the shape memory material member(s) 720 can be achieved. Indeed, the difference in movement of the shape memory material member(s) 720 is shown on FIGS. 9A and 9B.

Figure 9A:
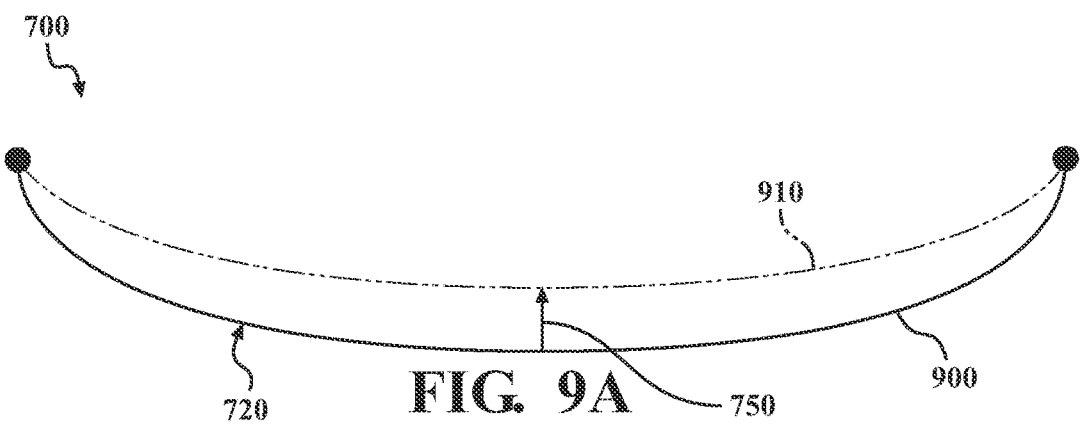
FIG. 9A shows an example of the shape memory material member without a spacer, showing the difference between a non-activated condition and an activated condition of the shape memory material member.

FIG. 9A shows an example of the shape memory material member(s) 720 when the spacer 730 is not used. For simplicity and/or clarity, only the shape memory material member(s) 720 are shown in this figure; other nearby structure(s) are not shown. The shape memory material member(s) 720 can have a non-activated condition 900. When activated, the shape memory material member(s) 720 can contract to an activated condition 910. The shape memory material member(s) 720 can move the distance 750 toward the cushion portion 708 and/or toward the seat occupant.

Figure 9B:
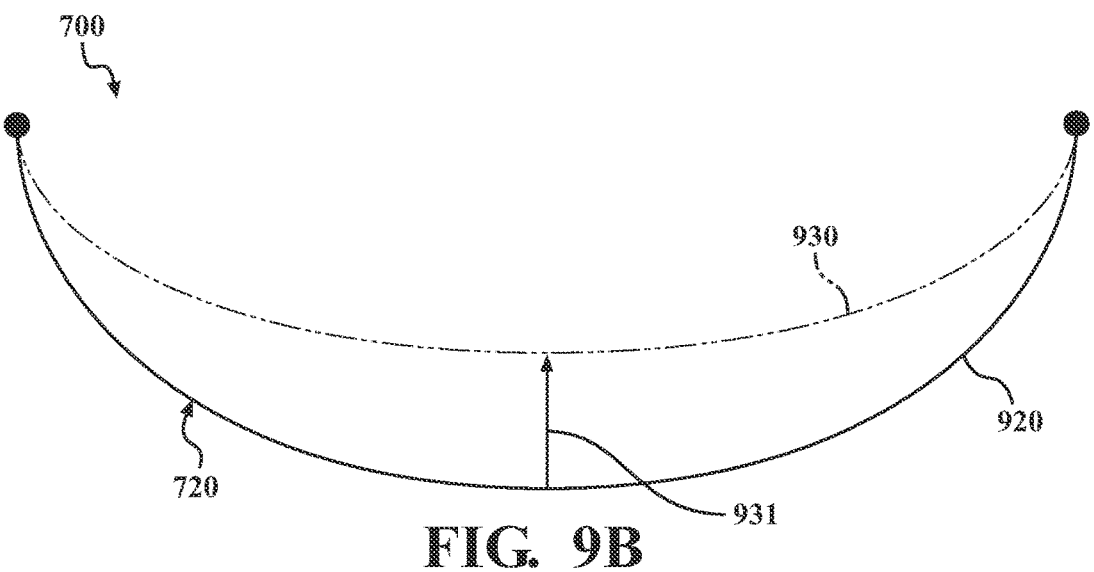
FIG. 9B shows an example of the shape memory material member with a spacer, showing the difference between a non-activated condition and an activated condition of the shape memory material member.

FIG. 9B shows an example of the shape memory material member(s) 720 with the spacer 730. The spacer 730 and other structures are not shown in this figure for simplicity and/or clarity of the description. The shape memory material member(s) 720 can have a non-activated condition 920. When activated, the shape memory material member(s) 720 can contract to an activated condition 930. The shape memory material member(s) 720 can move a distance 931 toward the cushion portion 708 and/or toward the seat occupant.

Notably, the distance 931 is greater than the distance 750. Also, it should be noted that, in the non-activation condition, the degree of curvature of the shape memory material member(s) 720 is greater in FIG. 9B compared to FIG. 9A. Thus, the presence of the spacer 730 can cause the shape memory material member(s) 720 to have a greater curvature than they would otherwise have in the absence of the spacer 730. It will be appreciated that such greater curvature can enable the contraction of the shape memory material member(s) 720 to impart an increased push force on a seat occupant.

Figure 10:
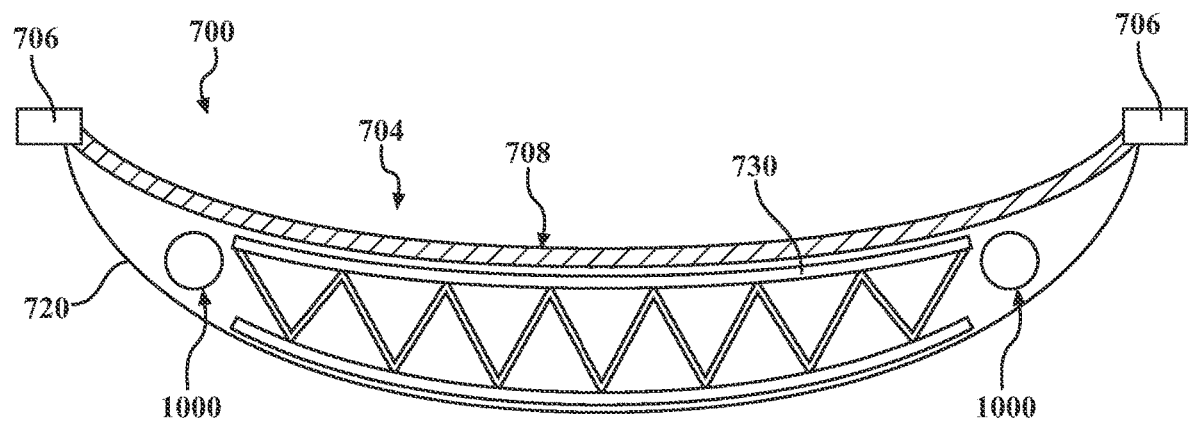
FIG. 10 is an example of a cross-section view of a back portion of the chair, showing a one or more cooling elements.

The seat 700 can have one or more other features to facilitate the operation of the shape memory material member(s) 720. For instance, referring to FIG. 10, the seat 700 can include one or more cooling elements 1000. The cooling element(s) 1000 can be operatively positioned to supply cooling air or other coolant to the shape memory material member(s) 720. In some arrangements, the cooling element(s) 1000 can be located between the cushion portion 708 and the shape memory material member(s) 720. In some arrangements, the cooling element(s) 1000 can be located laterally outboard of the spacer 730, as shown in FIG. 10.

The cooling element(s) 1000 can cause cooling air to be supplied to the shape memory material member(s) 720, particularly when deactivated. The cooling air can facilitate cool down of the shape memory material member(s) 720. As a result, the shape memory material member(s) 720 can return to a non-activated configuration sooner. The cooling element(s) 1000 can include one or more coolant routing structures (e.g., ducts, conduits, channels, etc.) and/or one or more air movement devices (e.g., fan, blower, etc.).

It will be appreciated that the use of the spacer 730 can increase the curvature of the shape memory material member. As a result, an increased push force from the shape memory material member to the occupant's back can be experienced. When the curvature of the seat back is deeper, the push force from the shape memory material member to the occupant can be higher. The higher push force can be due to longer length of the shape memory material member and/or due to a deeper curvature being more effective.

Figure 11:
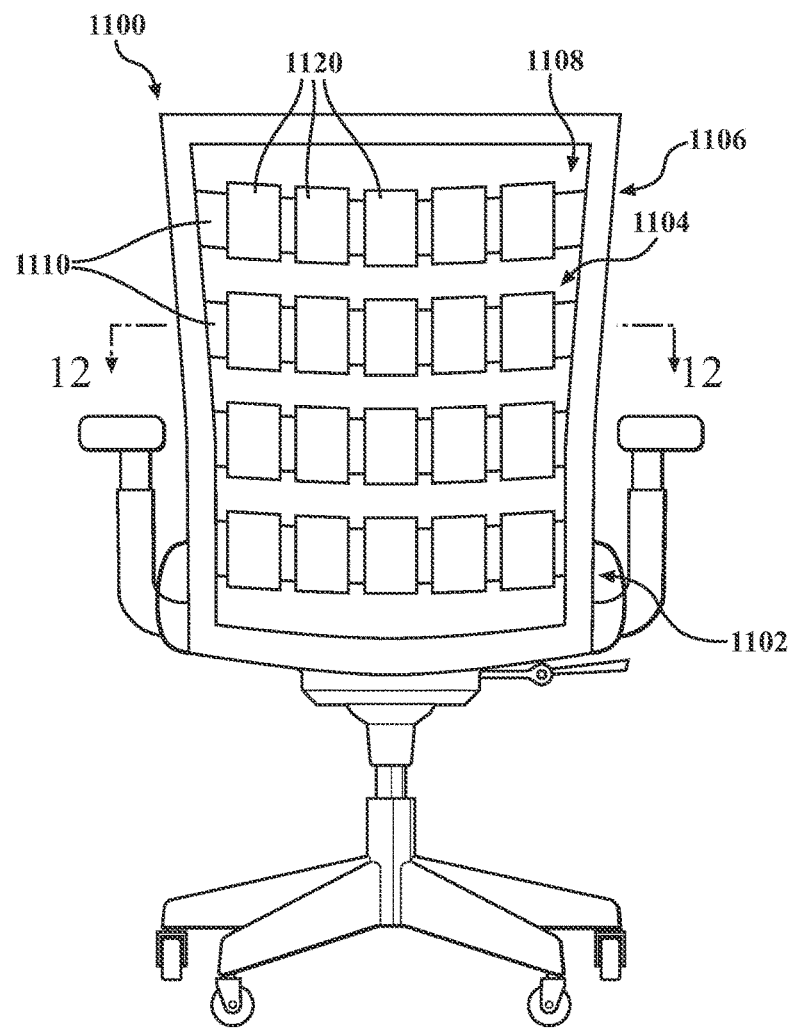
FIG. 11 is an example of a chair with a plurality of shape memory material member-actuated movable members on a back portion of the chair.

A third example of implementations of the system 100 is shown in connection with FIGS. 11-15. Referring to FIG. 11, an example of a seat 1100 is shown. In this example, the seat can be an office chair. However, it will be appreciated that arrangements described herein are not limited to being office chairs. Indeed, the seat 1100 in FIGS. 11-15 can be any type of seat, now known or later developed. In some arrangements, the seat 1100 can be a vehicle seat, a chair, a massage chair, a gaming chair, a recliner, or other seat structure.

The seat 1100 can include a seat portion 1102 and a back portion 1104. The back portion 1104 can have any suitable configuration, now known or later developed. In some arrangements, the back portion 1104 can include a frame 1106 and a cushion portion 1108. The cushion portion 1108 can be operatively connected to the frame 1106. In some arrangements, the cushion portion 1108 can be a single piece. In some arrangements, the cushion portion 1108 can include a plurality of strap members 1110. In some arrangements, the plurality of strap members 1110 can extend substantially laterally across the back portion 1104. The strap members 1110 can be operatively connected to the frame 1106. The plurality of strap members 1110 can be substantially parallel to each other. In some arrangements, the plurality of strap members 1110 can be spaced from each other. In some arrangements, neighboring strap members 1110 can abut each other, or they can even overlap each other. In some arrangements, the strap members 1110 can be separate from the cushion portion 1108. In some instances, the cushion portion 1108 can be located closer to a seat occupant than the strap members 1110.

The seat 1100 can include a plurality of actuators 1120. The actuators 1120 can be distributed on the back portion 1104 of the seat 1100. Any suitable distribution of the actuators 1120 can be provided. In one or more arrangements, the actuators 1120 can be distributed laterally across the back portion 1104 of the seat 1100. In such case, a row of the actuators 1120 can be formed. The actuators 1120 can be distributed in any suitable manner in the row. For instance, the actuators 1120 can be substantially equally spaced. Alternatively, one or more of the actuators 1120 can be non-equally spaced from the other actuators 1120.

In some arrangements, a plurality of actuators 1120 can be arranged in one or more rows. The plurality of rows of the actuators 1120 can extend substantially parallel to each other. However, in some arrangements, one or more of the rows can be non-parallel to the other rows. The plurality of rows of the actuators 1120 can be spaced from each other in the elevational direction E. In some arrangements, the plurality of rows of the actuators 1120 can be substantially equally spaced from each other. In some arrangements, one of more of the plurality of rows of the actuators 1120 can be non-equally spaced from the other plurality of rows of the actuators 1120.

The actuators 1120 can be substantially identical to each other. Alternatively, one or more of the actuators 1120 can be different from the other actuators 1120 in one or more respects, including in any of the various respects described herein.

There can be any number of actuators 1120. For instance, while FIG. 11 shows an example in which there are five actuators 1120 in each row, it will be appreciated that there can be more or fewer actuators 1120 in each row. In some arrangements, the quantity of actuators 1120 in each row can be substantially identical. In other arrangements, the quantity of actuators 1120 in one or more of the rows can be different than the quantity of actuators in one or more of the other rows.

In some arrangements, the cushion portion 1108 can include a plurality of strap members 1110 extending laterally across the back portion 1104. In some arrangements, one or more of the actuators 1120 can be associated with a strap member 1110. The actuators 1120 can be operatively connected to the strap members 1110 in any suitable manner. In some arrangements, there can be more than actuators 1120 associated with at least one of the strap members 1110. When provided in connection with a strap member 1110, the plurality of actuators 1120 can be configured to be selectively movable along the length of the strap member 1110. The actuators 1120 can be attached to the strap members(s) 1110. For instance, the actuator(s) 1120 can be located on a seat occupant-facing side of the strap member(s) 1110, or the actuator(s) 1120 can be located on a side of the strap member(s) 1110 that faces away from a seat occupant. Alternatively, the actuators 1120 can be attached to a different structure. In such case, the actuators 1120 can be operatively positioned to act upon the strap member(s) 1110 and/or the cushion portion 1108 when activated.

The plurality of actuators 1120 can be activated and/or deactivated independently from each other. In some arrangements, the plurality of actuators 1120 can be activated and/or deactivated as a group. For instance, one or more rows of the actuators 1120 can be activated. Alternatively, one or more portions of a row can be activated. For instance, for one or more of the rows, the actuators 1120 on the right-side or on the left side of the row can be activated. In some arrangements, the actuators 1120 in a central region of one or more rows can be activated.

Figure 12:
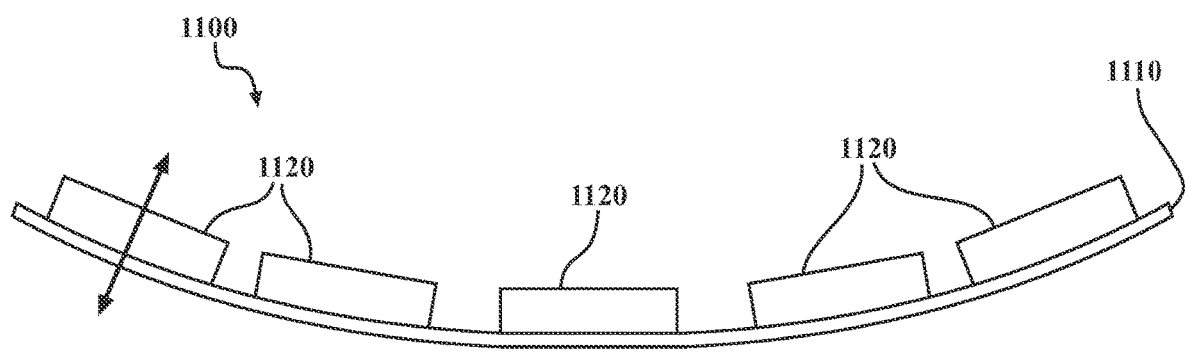
FIG. 12 is an example of a cross-section view of a back portion of the chair, showing a direction of motion of the shape memory material member-actuated movable members on a back portion of the chair.

In some arrangements, the actuators 1120 can be attached to a front side of the strap members 1110. Thus, the actuators 1120 can face away from a seat occupant. Thus, when activated, the actuators 1120 can move in a direction toward an occupant of the seat 1100. An example of such motion is generally shown in FIG. 12.

The actuators 1120 can have any suitable configuration. For instance, the actuators 1120 can include a movable member and a shape memory material member attached to the movable member. The shape memory material member(s) can be the shape memory material members 180 described in connection with FIG. 1 above. When activated, the shape memory material member can contract and can cause the movable member to move. The movement of the movable member can create a push force on the cushion portion 1108 and, thus, the seat occupant. The general direction of movement of the actuators 1120 is shown in FIG. 12.

Figure 13:
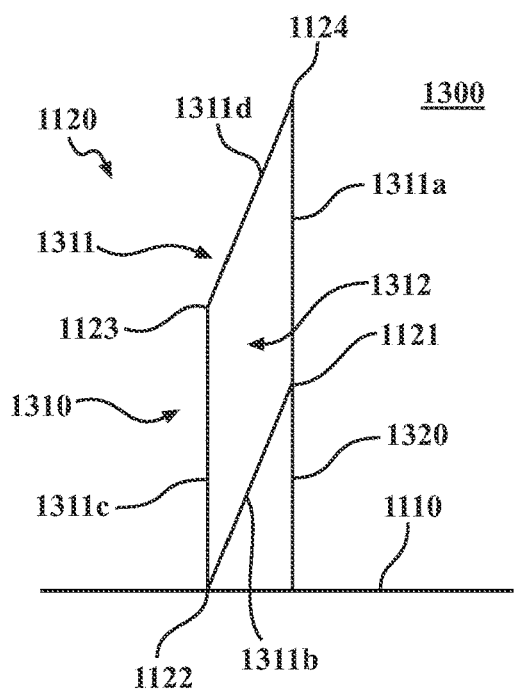
FIG. 13 is an example of the movable member as a four-bar linkage, showing a non-activated configuration.
Figure 14:
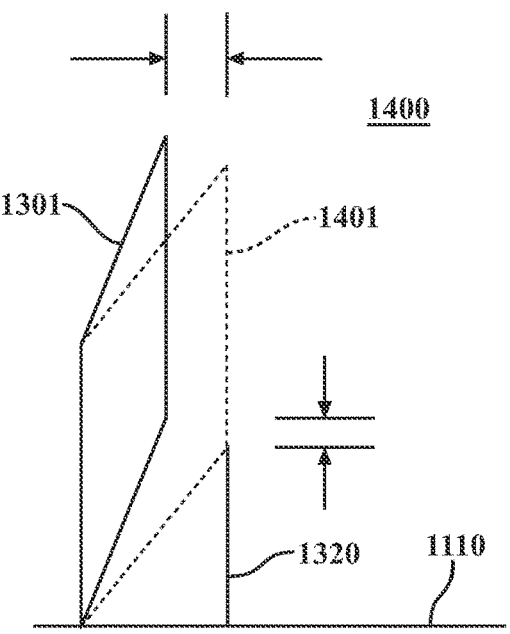
FIG. 14 is an example of the movable member as a four-bar linkage, showing an activated configuration.
Figure 15:
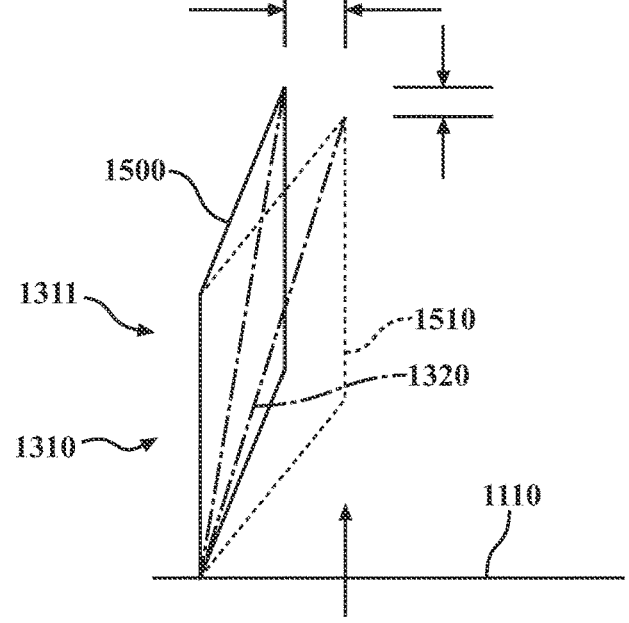
FIG. 15 is an example of the movable member as a four-bar linkage, showing an example of an alternative arrangement of a shape memory material member on the movable member and further showing an activated and a non-activated configuration.

Some examples of the actuators are shown in FIGS. 13-15. Referring to FIGS. 13-14, one example of the actuator 1120 is shown. The actuator 1120 can include a movable member 1310 and a shape memory material member 1320. In this example, the movable member 1310 can be a four-bar linkage 1311. The four-bar linkage 1311 can include four segments 1311*a*, 1311*b*, 1311*c*, 1311*d*.

The one or more arrangements, the four segments 1311*a*, 1311*b*, 1311*c*, 1311*d* can be separate pieces that are subsequently operatively connected to each other. Any suitable form of operative connection can be used, including, for example, one or more welds, one or more fasteners, one or more adhesives, and/or one or more forms of mechanical engagement, just to name a few possibilities. In some arrangements, the operative connection between intersecting segments can be fixed such that the intersecting segments do not substantially move relative to each other when the actuator 1120 is activated. In some arrangements, the operative connection between intersecting segments can permit relative movement between the intersecting segments. In one or more arrangements, the four segments 1311*a*, 1311*b*, 1311*c*, 1311*d* can be formed a single unitary structure.

The four-bar linkage 1311 can have any suitable size and/or shape. In one or more arrangements, the four-bar linkage can be substantially rectangular, substantially square, substantially parallelogram, substantially trapezoid, substantially quadrilateral, substantially triangular, or substantially polygonal in confirmation. The four segments 1311*a*, 1311*b*, 1311*c*, 1311*d* can define an open interior 1312. The segments 1311*a*, 1311*b*, 1311*c*, 1311*d* can be hollow, or the segments 1311*a*, 1311*b*, 1311*c*, 1311*d* can be solid. The segments 1311*a*, 1311*b*, 1311*c*, 1311*d* can have any suitable cross-sectional size, shape, and/or configuration. The segments 1311*a*, 1311*b*, 1311*c*, 1311*d* can be substantially identical to each other, or one or more of the segments can be different from the other segments 1311*a*, 1311*b*, 1311*c*, 1311*d* in one or more respects. In some arrangements, the movable member 1130 can be a single sheet-like piece of material.

There can be any suitable arrangement between the shape memory material member 1320 and the movable member 1310. FIGS. 13 and 14 show an example in which the shape memory material member 1320 can be operatively connected to a corner of the four-bar linkage 1311.

FIG. 13 shows an example of a non-activated configuration 1300 of the actuator 1120. In some arrangements, a corner 1121 of the actuator 1120 can be operatively connected to a structure, which can be the strap member 1110 of the seat 1100. However, in other arrangements, one of the segments (e.g., segment 1311a) of the four-bar linkage 1311 can be operatively connected to the strap member 1110. The shape memory material member 1320 can be operatively connected at one end to a corner 1122 of the actuator 1120. The other end of the shape memory material member 1320 can be operatively connected to the strap member 1110.

FIG. 14 shows an example of an activated configuration 1400. Here, the shape memory material member 1320 has been activated (e.g., such as by heating). As a result, the shape memory material member 1320 can contract. The contraction of the shape memory material member 1320 can pull the four-bar linkage 1311, causing the four-bar linkage 1311 to move from a non-activate position 1301 to an activated position 1401. As a result of such position change, the four-bar linkage 1311 can move toward the cushion portion 1108 and/or toward the seat occupant. The compressive effects of the four-bar linkage 1311 can be felt by a seat occupant.

Referring to FIG. 15, another arrangement between the shape memory material member 1320 and the movable member 1310 is shown. FIG. 15 shows an example in which the shape memory material member 1320 can be operatively connected to a corner 1123 of the four-bar linkage 1311. The shape memory material member 1320 can extend across the four-bar linkage 1311 to the substantially diagonally opposite corner 1121. The shape memory material member 1320 can be operatively connected to the corner 1121 and/or to the structure (e.g., the strap member 1110).

Thus, when activated, the shape memory material member 1320 can contract. As a result, the four-bar linkage 1311 can move from a non-activated position 1500 to an activated configuration 1510. As a result of such position change, the four-bar linkage 1311 can move toward the cushion portion 1108. The push force of the four-bar linkage 1311 can be felt by a seat occupant.

The arrangements described in connection with FIGS. 11-15 can increase the movement of the seat portion (e.g., the back portion), which can create a better perception for the occupant. Also, the actuators can be distributed in a substantially horizontal row, so different levels of movement and at different times can be achieved. The variation in movement of actuator can improve the feel and effectiveness of massaging action or other desired effect.

Figure 16:
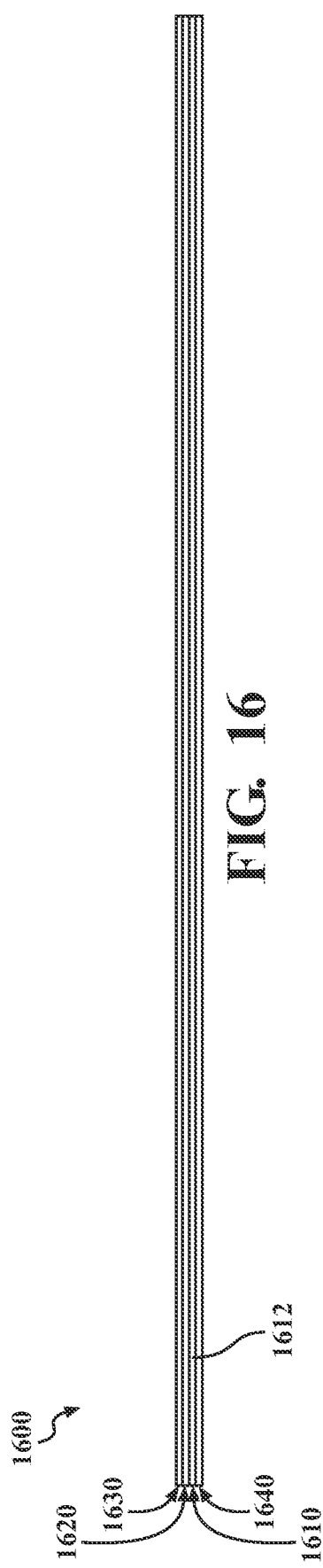
FIG. 16 is an example of a mat-like actuator including a shape memory material member layer, showing a non-activated configuration.
Figure 17:
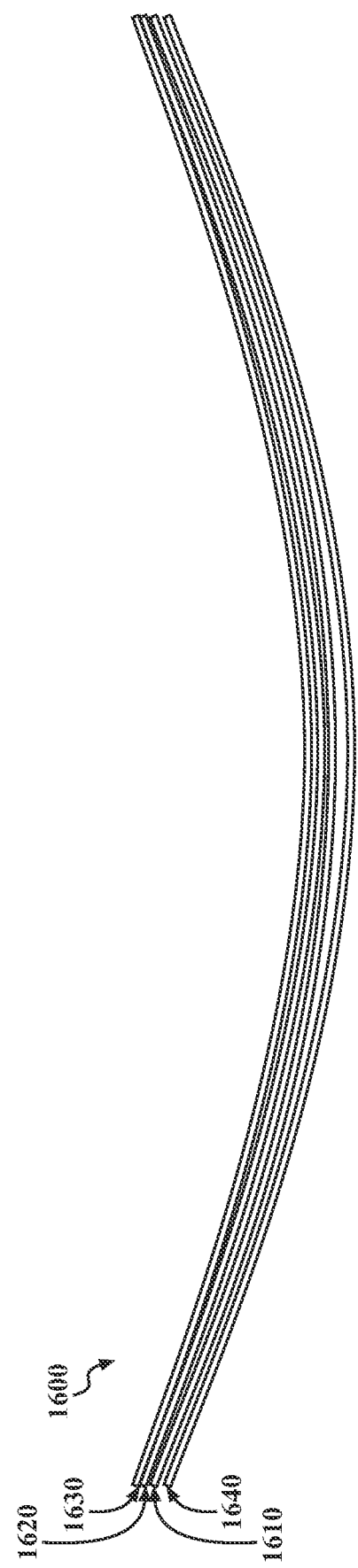
FIG. 17 is an example of the mat-like actuator including the shape memory material member sheet, showing an activated configuration.
Figure 18:
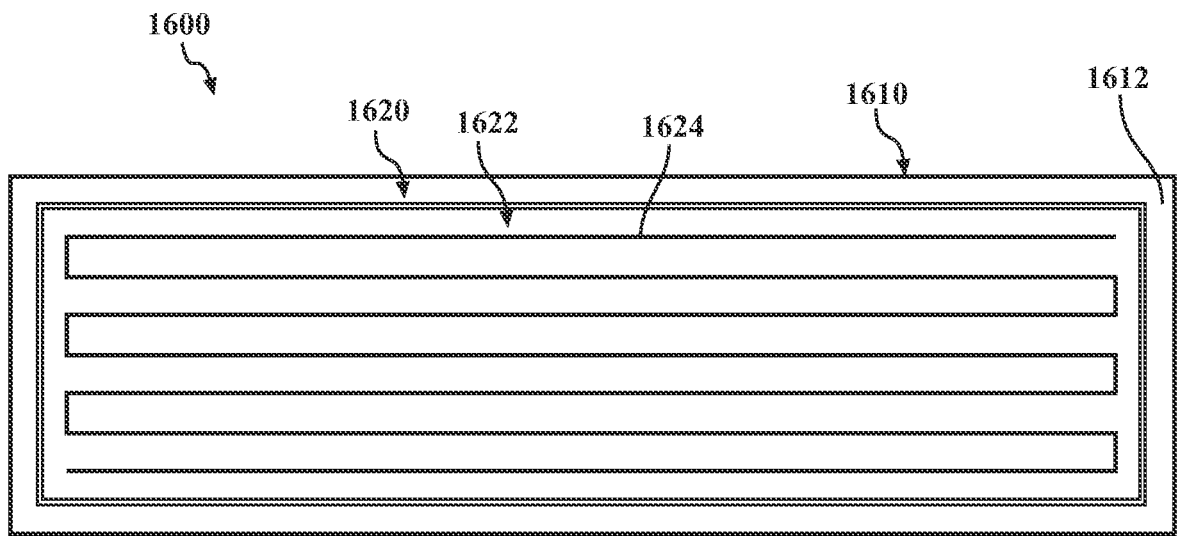
FIG. 18 is a view of the mat-like actuator of FIG. 16, showing an arrangement of a heating element on the shape memory material sheet.

A fourth example of implementations of the system 100 is shown in connection with FIGS. 16-20. Referring to FIGS. 16-18, an example of an actuator 1600 is shown. The actuator 1600 can be configured as a mat-like actuator. The actuator 1600 can be used in connection with any portion of a seat, including for example, a seat portion, a back portion, a head rest portion, a bolster portion, and/or a massaging portion. The actuator 1600 can be operatively positioned with respect to the seat to cause a portion of the seat to be adjusted. Further, the actuator 1600 can be used in connection with any type of seat, such as a vehicle seat, an office chair, a chair, a massage chair, a gaming chair, a recliner, or any other seat structure, now known or later developed.

The actuator 1600 can include an activation layer 1610 and a heating layer 1620. The activation layer 1610 can include one or more shape memory material members. The shape memory material member(s) can be the shape memory material members 180 described in connection with FIG. 1 above. In one or more arrangements, the activation layer 1610 can include a shape memory material sheet 1612. The shape memory material sheet 1612 can provide greater force and energy compared to a shape memory material wire.

The shape memory material sheet 1612 can have any suitable size, shape, and/or configuration. In one or more arrangements, the shape memory material sheet 1612 can be substantially rectangular in conformation, but it will of course be appreciated that other shapes are possible.

The heating layer 1620 can be provided on one side of the activation layer 1610. The heating layer 1620 can be operatively connected to the activation layer 1610. For instance, the heating layer 1620 can be operatively connected to the activation layer 1610 by one or more adhesives, one or more fasteners, and/or one or more forms of mechanical engagement, just to name a few possibilities.

The heating layer 1620 can cover a portion of a side of the activation layer 1610. In some arrangements, the heating layer 1620 can extend across or otherwise cover a majority of the activation layer 1610. In some arrangements, the heating layer 1620 can extend across or otherwise cover a substantial majority of a side of the activation layer 1610. In some arrangements, the heating layer 1620 can extend across or otherwise cover an entire side of the activation layer 1610.

The heating layer 1620 can include one or more heating elements 1622. The heating elements 1622 can include, for example, one or more conductors 1624. The conductor(s) 1624 can be arranged in any suitable manner. For instance, in one or more arrangements, the conductor(s) 1624 can extend in a serpentine manner on the activation layer 1610. One example of a serpentine arrangement of the conductor(s) 1624 is shown in FIG. 18. The conductor(s) 1624 can be made of any conductive material, now known or later developed. In some arrangements, the heating elements 1622 can be a part of a seat heater system of a vehicle.

In some arrangements, the actuator 1600 can further include an insulating layer 1630. The insulating layer 1630 can be provided on the same side of the activation layer 1610 as the heating layer 1620. Thus, the heating layer 1620 can be located between the insulating layer 1630 and the activation layer 1610. The insulating layer 1630 can be operatively connected to the activation layer 1610 and/or to the heating layer 1620. For instance, the insulating layer 1630 can be operatively connected to the activation layer 1610 and/or the heating layer 1620 by one or more adhesives, one or more fasteners, and/or one or more forms of mechanical engagement, just to name a few possibilities. The insulating layer 1630 can span across the entire heating layer 1620 and/or the activation layer 1610.

The insulating layer 1630 can include any suitable insulating material, now known or later developed. The insulating layer 1630 can be provided on an occupant-facing side of the actuator 1600. The insulating layer 1630 can be configured to protect a seat occupant from heat generated by the heating layer 1620.

In some arrangements, the actuator 1600 can include one or more features to facilitate the operation of the activation layer 1610. For instance, the actuator 1600 can include one or more cooling elements 1640. The cooling element(s) 1640 can be operatively positioned to supply cooling air or other coolant to the activation layer 1610.

The cooling element(s) 1640 can be provided on a side of the activation layer 1610 opposite the heating layer 1620. In some arrangements, the cooling element(s) 1640 can be provided in the form of a cooling layer. The cooling element(s) 1640 can be operatively positioned with respect to the activation layer 1610. The cooling element(s) 1640 can be operatively connected to the activation layer 1610.

For instance, the cooling element(s) 1640 can be operatively connected to the activation layer 1610 by one or more adhesives, one or more fasteners, and/or one or more forms of mechanical engagement, just to name a few possibilities.

The cooling element(s) 1640 can cover a portion of a side of the activation layer 1610. In some arrangements, the cooling element(s) 1640 can extend across or otherwise cover a majority of the activation layer 1610. In some arrangements, the cooling element(s) 1640 can extend across or otherwise cover a substantial majority of a side of the activation layer 1610. In some arrangements, the cooling element(s) 1640 can extend across or otherwise cover an entire side of the activation layer 1610.

The cooling element(s) 1640 can cause cooling air to be supplied to the activation layer 1610, particularly when deactivated. The cooling element(s) 1640 can facilitate cool down of the activation layer 1610. As a result, the activation layer 1610 can return to a non-activated configuration sooner. The cooling element(s) 1640 can include one or more coolant routing structures (e.g., ducts, conduits, channels, etc.) and/or one or more air movement devices (e.g., fan, blower, etc.). In some arrangements, the cooling element(s) 1640 can include a coating or a material.

The actuator 1600 can be activated by activating the heating layer 1620. For instance, electrical energy (e.g., from the power source(s) 140) can be supplied to the heating layer 1620. As the heating layer 1620 increases in temperature, the activation layer 1610 can become activated. As a result, the activation layer 1610 can contract. The contraction of the activation layer 1610 can cause the actuator 1600 to morph from a non-activated configuration (FIG. 16) to an activated configuration (FIG. 17). In this example, the actuator 1600 can be substantially flat in the non-activated configuration. The actuator 1600 can be curved, curled, or otherwise non-flat in the activated configuration. In going from the non-activated configuration to the activated configuration, an overall height of the actuator 1600 can increase.

In some arrangements, the actuator 1600 can include a plurality of shape memory material sheets. Such a configuration can allow for greater control of the shape of the actuator 1600 when activated. Examples of such a configuration are shown in FIGS. 19-20.

There can be any number of shape memory material sheets. FIG. 19 shows an example in which the actuator 1600 includes four shape memory material sheets 1612a, 1612b, 1612c, 1612d. FIG. 20 shows an example in which there are eleven shape memory material sheets, it will be appreciated that there can be more or fewer shape memory material sheets. Each of the shape material member sheets can define in part an actuator segment 1650.

Figure 19:
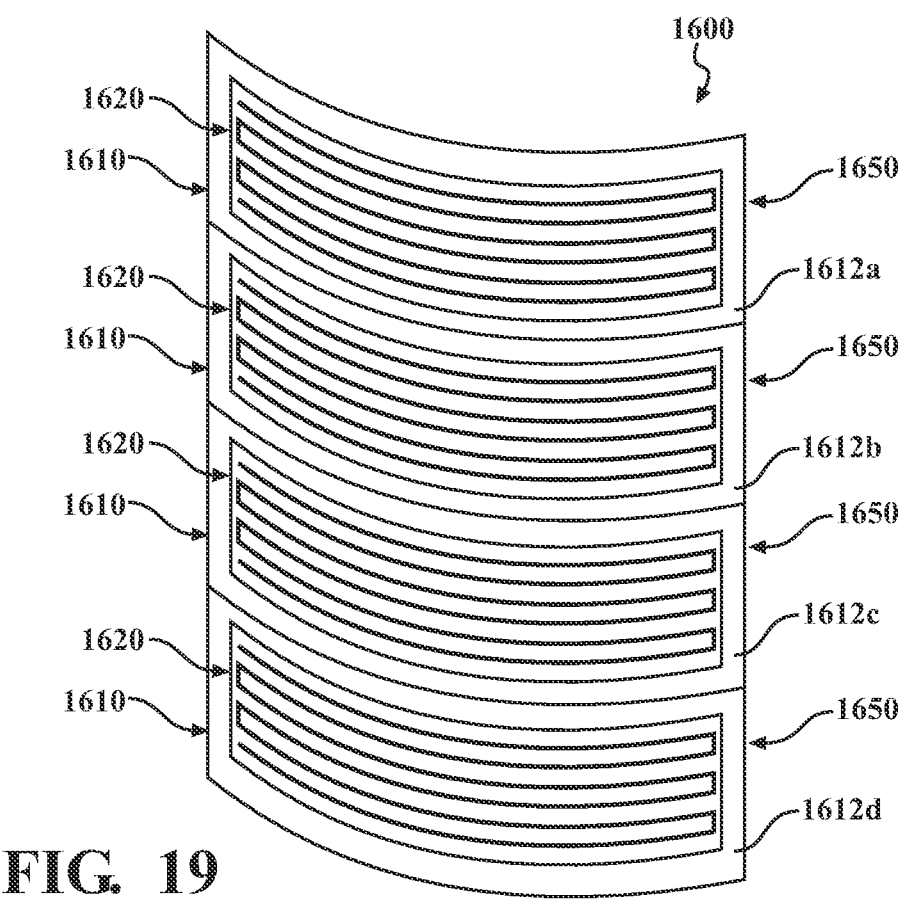
FIG. 19 is an example of a mat-like actuator including plurality of shape memory material sheets.
Figure 20:
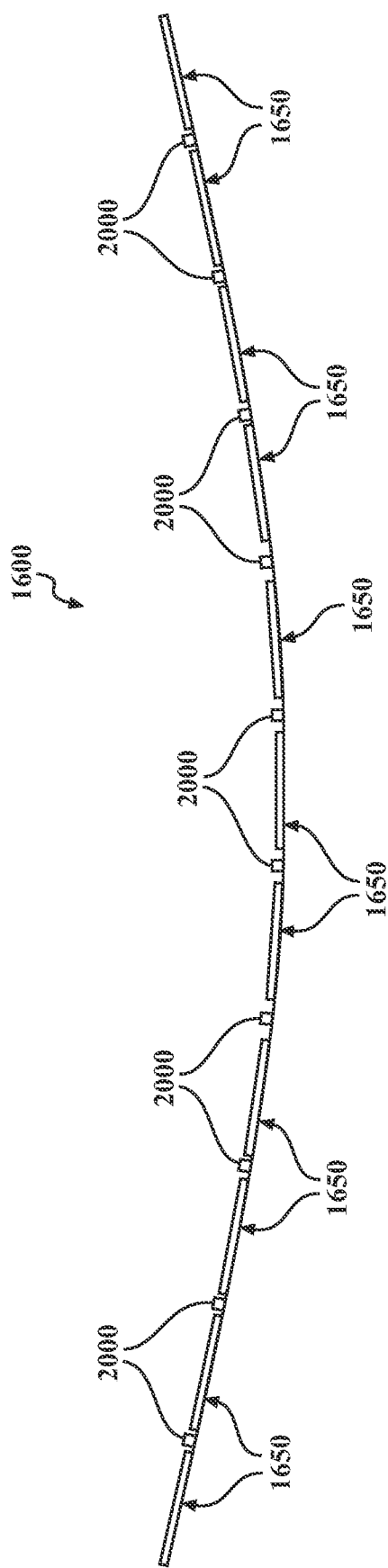
FIG. 20 is another view of the mat-like actuator including a plurality of shape memory material sheets.

In the arrangement shown in FIG. 19, each of the shape memory material sheets 1612 can have an associated heating layer 1620. In some arrangements, each of the shape memory material sheets 1612 can have an associated insulating layer and/or an associated cooling element(s) (not shown in FIG. 19 for simplicity and/or clarity to facilitate the description). In some arrangements, the insulating layer can be a single continuous layer across two or more of the shape memory material sheets 1612.

Each shape memory material sheet 1612 can be operatively connected to a neighboring shape memory material sheet 1612. Any suitable form of operative connection can be used. In some arrangements, the operative connection can enable at least some degree of relative movement between neighboring shape memory material sheets 1612. FIG. 20 shows an example in which neighboring shape memory material sheets 1612 are connected by one or more hinges 2000. The hinges 2000 or other type of connection can allow the neighboring shape memory material sheets to flex and move.

It will be appreciated that arrangements described herein can provide numerous benefits, including one or more of the benefits mentioned herein. Arrangements described herein can move a vehicle occupant within a seat or adjust an occupant's posture. For example, arrangements described herein can provide lateral support for a vehicle occupant in conditions in which high lateral acceleration forces are experienced by the occupant. As another example, arrangements described herein can be used to move the occupant away from an impact (e.g., a side impact). The movement may only be relatively small (a few millimeters or an inch), but it can be a helpful countermeasure. Arrangements described herein can avoid the use of large and complicated gears and actuators, thereby enabling more compact designs and packaging. Arrangements described here can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A seat comprising:
a back portion;
a plurality of shape memory material members spanning laterally across the back portion, the shape memory material members having opposing ends, the opposing ends being operatively connected to a back portion structure; and
a plurality of tubular members, the tubular members being hollow, the tubular members receiving a substantial majority of a respective one of the shape memory material members, a portion of the respective one of the shape memory material members being exposed outside of the tubular member, a plurality of apertures being defined in the tubular members, whereby the apertures facilitate cooling of the shape memory material members,
whereby, when activated, the shape memory material members contract such that an effect of the contraction is concentrated in the portion of the respective one of the shape memory material members that is exposed outside of the tubular member.

2. The seat of claim 1, further including:
one or more power sources operatively connected to the shape memory material members; and
one or more processors operatively connected to control a supply of electrical energy from the one or more power sources to the shape memory material members, wherein the one or more processors are programmed to initiate executable operations comprising:
determining whether a seat activation condition is met; and
responsive to determining that the seat activation condition is met, causing electrical energy to be supplied to one of the shape memory material members, whereby the shape memory material members are activated.

3. The seat of claim 1, wherein the tubular members are centrally located on the respective shape memory material members.

4. The seat of claim 1, wherein one of the tubular members is offset relative to the respective shape memory material member such that only one end portion of the shape memory material member is exposed.

5. The seat of claim 1, wherein the tubular members are made of a material configured to withstand at least about 110 degrees Celsius to about 120 degrees Celsius.

6. A seat comprising:
a back portion, the back portion including a cushion portion,
a plurality of shape memory material members extending laterally across the back portion, the shape memory material members having opposing ends, the opposing ends being operatively connected to a back portion structure, the plurality of shape memory material members being spaced from each other in an elevation direction; and
a spacer located between at least one of the plurality of shape memory material members and the cushion portion, the spacer causing a curvature of the at least one of the plurality of shape memory material members,
whereby the spacer causes the at least one of the plurality of shape memory material members to have a greater curvature, whereby, when activated, the shape memory material members contract and impart an increased push force on a seat occupant.

7. The seat of claim 6, further including:
one or more power sources operatively connected to the shape memory material members; and
one or more processors operatively connected to control a supply of electrical energy from the one or more power sources to the shape memory material members, wherein the one or more processors are programmed to initiate executable operations comprising:
determining whether an activation condition is met; and
responsive to determining that the activation condition is met, causing electrical energy to be supplied to one of the shape memory material members, whereby the shape memory material members are activated.

8. The seat of claim 6, wherein the cushion portion includes a plurality of straps extending laterally across the back portion, and wherein one of the plurality of shape memory material members is associated with each strap.

9. The seat of claim 6, wherein the spacer is an auexetic spacer.

10. The seat of claim 6, further including at least one of one or more ducts and one or more fans operatively positioned to provide cooling air to the plurality of shape memory material members.

11. A seat comprising:
a back portion, the back portion including a cushion portion; and
an actuator operatively positioned on the back portion, the actuator including a movable structure and a shape memory material member attached to the movable structure, the movable structure being a four-bar linkage,
whereby, when activated, the shape memory material member contracts and causes the movable structure to move so as to create a push force on the cushion portion, whereby a push force on a seat occupant is increased.

12. The seat of claim 11, further including:
one or more power sources operatively connected to the shape memory material members; and
one or more processors operatively connected to control a supply of electrical energy from the one or more power sources to the shape memory material members, wherein the one or more processors are programmed to initiate executable operations comprising:
determine whether an activation condition is met; and
responsive to determining that the activation condition is met, causing electrical energy to be supplied to one of the shape memory material members, whereby the shape memory material members are activated.

13. The seat of claim 11, wherein the actuator is a plurality of actuators distributed laterally across the back portion.

14. The seat of claim 11, wherein the cushion portion includes a plurality of straps extending laterally across the back portion.

15. A seat comprising:
a portion of the seat; and
an actuator, the actuator being operatively positioned with respect to the portion of the seat to cause the portion to be adjusted, the actuator being configured as a mat, the actuator including:
a shape memory material sheet; and
a heating element extending on the shape memory material sheet,
when heated by the heating element, the shape memory material sheet contracts and causes the actuator to morph from a substantially flat configuration to a non-flat configuration, whereby an overall height of the actuator increases.

16. The seat of claim 15, further including:
one or more power sources operatively connected to the heating element; and
one or more processors operatively connected to control a supply of electrical energy from the one or more power sources to the heating element, wherein the one or more processors are programmed to initiate executable operations comprising:
determining whether an activation condition is met; and
responsive to determining that the activation condition is met, causing electrical energy to be supplied to the heating element.

17. The seat of claim 15, wherein the actuator further includes an insulating layer, and wherein the heating element is located between the shape memory material sheet and the insulating layer.

18. The seat of claim 15, wherein the heating element extends in a serpentine pattern on the shape memory material sheet.

19. A seat comprising:
a back portion;
a plurality of shape memory material members spanning laterally across the back portion, the shape memory material members having opposing ends, the opposing ends being operatively connected to a back portion structure; and
a plurality of tubular members, the tubular members being hollow, the tubular members receiving a substantial majority of a respective one of the shape memory material members, a portion of the respective one of the shape memory material members being exposed outside of the tubular member, the tubular members being rigid, whereby, during normal operational conditions of the seat and/or the shape memory material members, the tubular members do not substantially change in shape,
whereby, when activated, the shape memory material members contract such that an effect of the contraction is concentrated in the portion of the respective one of the shape memory material members that is exposed outside of the tubular member.

* * * * *